US009402051B2

(12) United States Patent
Lewis et al.

(10) Patent No.: US 9,402,051 B2
(45) Date of Patent: Jul. 26, 2016

(54) APPARATUS AND METHOD FOR SIMULTANEOUS LIVE RECORDING THROUGH AND PROJECTING LIVE VIDEO IMAGES ONTO AN INTERACTIVE TOUCH SCREEN

(71) Applicant: The SuperGroup Creative Omnimedia, Inc., Atlanta, GA (US)

(72) Inventors: John Bradford Lewis, Atlanta, GA (US); John Gabriel Aldridge, College Park, GA (US); John Michael Preziotti, Kennesaw, GA (US); Christopher Blaine Wallace, Decatur, GA (US)

(73) Assignee: THE SUPERGROUP CREATIVE OMNIMEDIA, INC., Atlanta, GA (US)

( * ) Notice: Subject to any disclaimer, the term of this patent is extended or adjusted under 35 U.S.C. 154(b) by 0 days.

(21) Appl. No.: 14/305,845

(22) Filed: Jun. 16, 2014

(65) Prior Publication Data

US 2015/0042746 A1    Feb. 12, 2015

Related U.S. Application Data

(60) Provisional application No. 61/835,571, filed on Jun. 15, 2013.

(51) Int. Cl.
*H04N 7/14* (2006.01)
*H04N 5/77* (2006.01)
*G07F 11/00* (2006.01)

(52) U.S. Cl.
CPC .............. *H04N 7/142* (2013.01); *G07F 11/002* (2013.01); *H04N 5/77* (2013.01)

(58) Field of Classification Search
CPC ......... H04N 7/142; H04N 5/77; G07F 11/002
USPC ................. 348/14.03, 40; 386/224; 713/323; 725/93; 160/135; 235/379; 353/30; 359/453

See application file for complete search history.

(56) References Cited

U.S. PATENT DOCUMENTS

| | | | | |
|---|---|---|---|---|
| 4,468,092 A * | 8/1984 | Inoue | .................... | G03B 21/625 359/457 |
| 4,708,435 A * | 11/1987 | Yata | ..................... | G03B 21/625 353/77 |
| 4,729,631 A * | 3/1988 | Takahashi | ............ | G03B 21/625 359/451 |
| 6,078,351 A * | 6/2000 | Hall, Jr. | .................... | G02B 5/32 345/419 |
| 6,550,521 B1 * | 4/2003 | McNabb | ................. | G03B 21/10 160/135 |
| 6,814,443 B2 * | 11/2004 | Safran | ...................... | G03B 21/26 353/30 |
| 6,829,086 B1 * | 12/2004 | Gibilini | ................ | G03B 21/625 359/453 |
| 7,346,271 B2 * | 3/2008 | Komi et al. | .................... | 386/232 |
| 8,035,624 B2 | 10/2011 | Bell et al. | | |
| 8,250,617 B2 * | 8/2012 | Hensgen et al. | ................. | 725/93 |
| 8,777,224 B2 * | 7/2014 | Gadda | ................. | G07F 17/3202 273/149 R |

(Continued)

OTHER PUBLICATIONS

Search Report and Written Opinion for International Patent Application No. PCT/US2014/042541; Dec. 11, 2014.

*Primary Examiner* — Gerald Gauthier
(74) *Attorney, Agent, or Firm* — Jason A. Bernstein; Barnes & Thornburg LLP

(57) ABSTRACT

A system and method for point to point video enable communication and the provisioning of at least one commodity. The communication between two remote devices may include both video and audio and may be activated by use of at least one touch screen associated with a device for provisioning the at least one commodity, such as, for example, a vending machine.

4 Claims, 24 Drawing Sheets

(56) References Cited

U.S. PATENT DOCUMENTS

| | | | |
|---|---|---|---|
| 2005/0178823 A1* | 8/2005 | Kuwahara | G06Q 30/02 235/379 |
| 2008/0052090 A1 | 2/2008 | Heinemann et al. | |
| 2008/0152304 A1* | 6/2008 | Yoo et al. | 386/92 |
| 2010/0259058 A1 | 10/2010 | Knighton et al. | |
| 2011/0102320 A1* | 5/2011 | Hauke | G06F 3/011 345/158 |
| 2011/0184812 A1 | 7/2011 | Stoulil | |
| 2012/0287321 A1 | 11/2012 | Border et al. | |
| 2013/0326250 A1* | 12/2013 | Sullivan et al. | 713/323 |
| 2014/0369660 A1* | 12/2014 | Lewis et al. | 386/224 |
| 2015/0042746 A1* | 2/2015 | Lewis et al. | 348/14.03 |

* cited by examiner

APPARATUS AND METHOD FOR SIMULTANEOUS LIVE RECORDING THROUGH AND PROJECTING LIVE VIDEO IMAGES ONTO AN INTERACTIVE TOUCH SCREEN

CROSS-REFERENCE TO RELATED APPLICATION

This application claims priority to U.S. Provisional Patent Application Ser. No. 61/835,571, filed Jun. 15, 2013, entitled APPARATUS AND METHOD FOR SIMULTANEOUS LIVE RECORDING THROUGH AND PROJECTING LIVE VIDEO IMAGES ONTO AN INTERACTIVE TOUCH SCREEN, the entirety of which is expressly incorporated herein by reference in its entirety.

FIELD

The present disclosure relates, in exemplary embodiments, to apparatus and methods for recording and projecting video images onto and through an interactive touch screen.

SUMMARY OF THE INVENTION

Exemplary embodiments may provide for an apparatus for simultaneously recording a first live video stream and projecting a second live video stream onto an interactive touch screen. Such an apparatus may comprise a touch screen panel, a polarized acrylic screen, at least one video camera having a lens; an active shutter lens having a liquid crystal layer sandwiched between a first and a second outer layer, the active shutter lens being proximate to the video camera lens; a projector adapted to project an image onto the polarized acrylic screen; a first computer; a second computer; and a means for connecting to the Internet. The apparatus may also be equipped to dispense objects such as, for example, sodas and other vending machine products.

Exemplary embodiments may also provide a method of facilitating communicating between two remote locations, comprising recording a first video stream through a first device in accordance with a first indication wherein the first indication is indicative of at least one interaction by a first user with the first device, receiving at the first device a second video stream recorded at a second device in accordance with a second indication wherein the second indication is indicative of at least one interaction by a second user with the second device, and providing at least one good at the first device in accordance with the second indication, wherein the first device is remote from the second device.

Thus, an apparatus and method are provided for simultaneous live recording through and projecting live video images onto an interactive touch screen, and the relevant services typically associated therewith. It is to be understood that both the foregoing general description and the following detailed description are exemplary and explanatory, and are intended to provide further explanation of the invention as discussed herein throughout.

BRIEF DESCRIPTION OF THE DRAWINGS

The drawings disclose exemplary embodiments in which like reference characters designate the same or similar parts throughout the figures of which.

DETAILED DESCRIPTION

Figure 1:
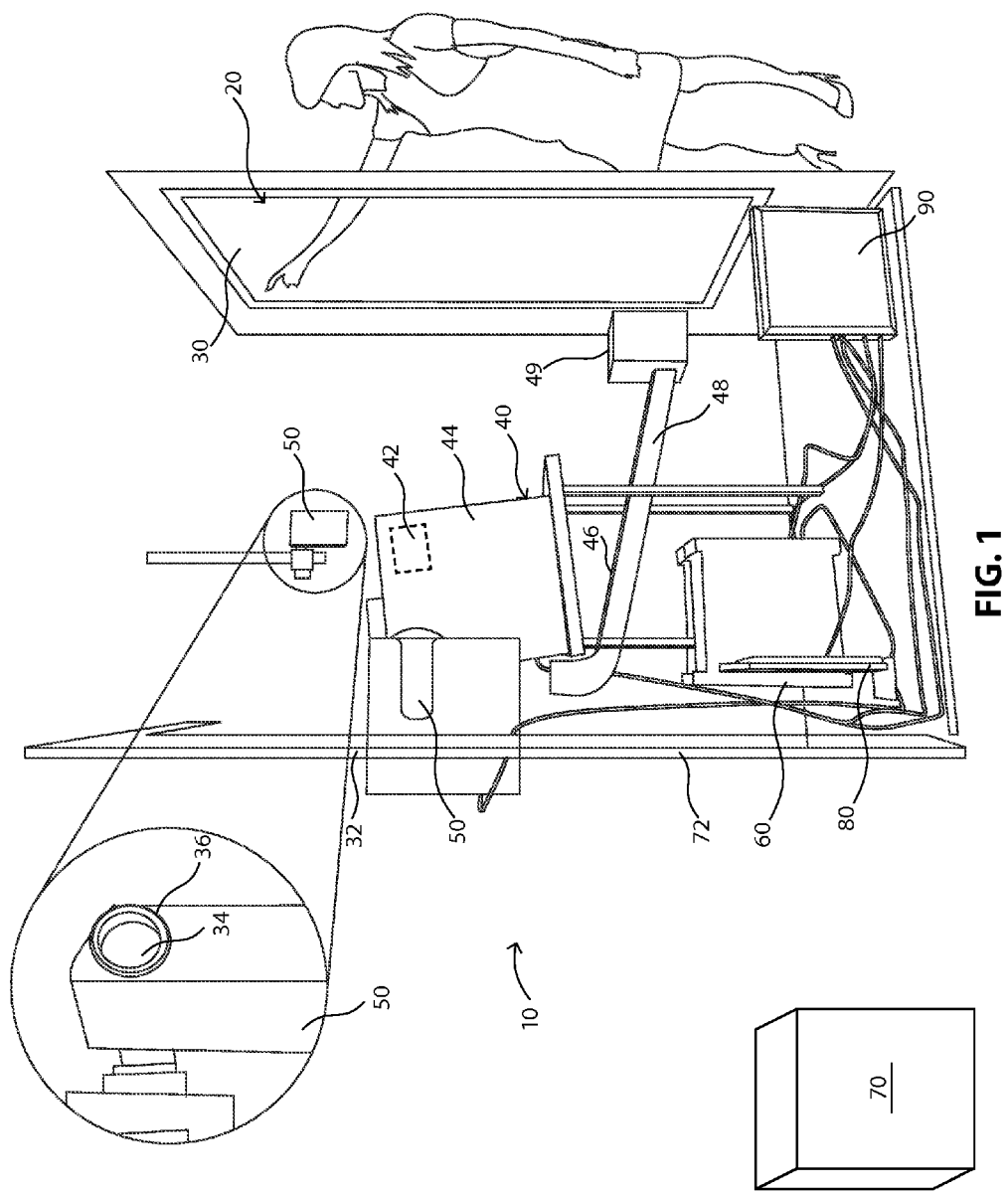
FIG. 1 is a perspective schematic view of one exemplary embodiment of an apparatus according to the present disclosure.
Figure 2:
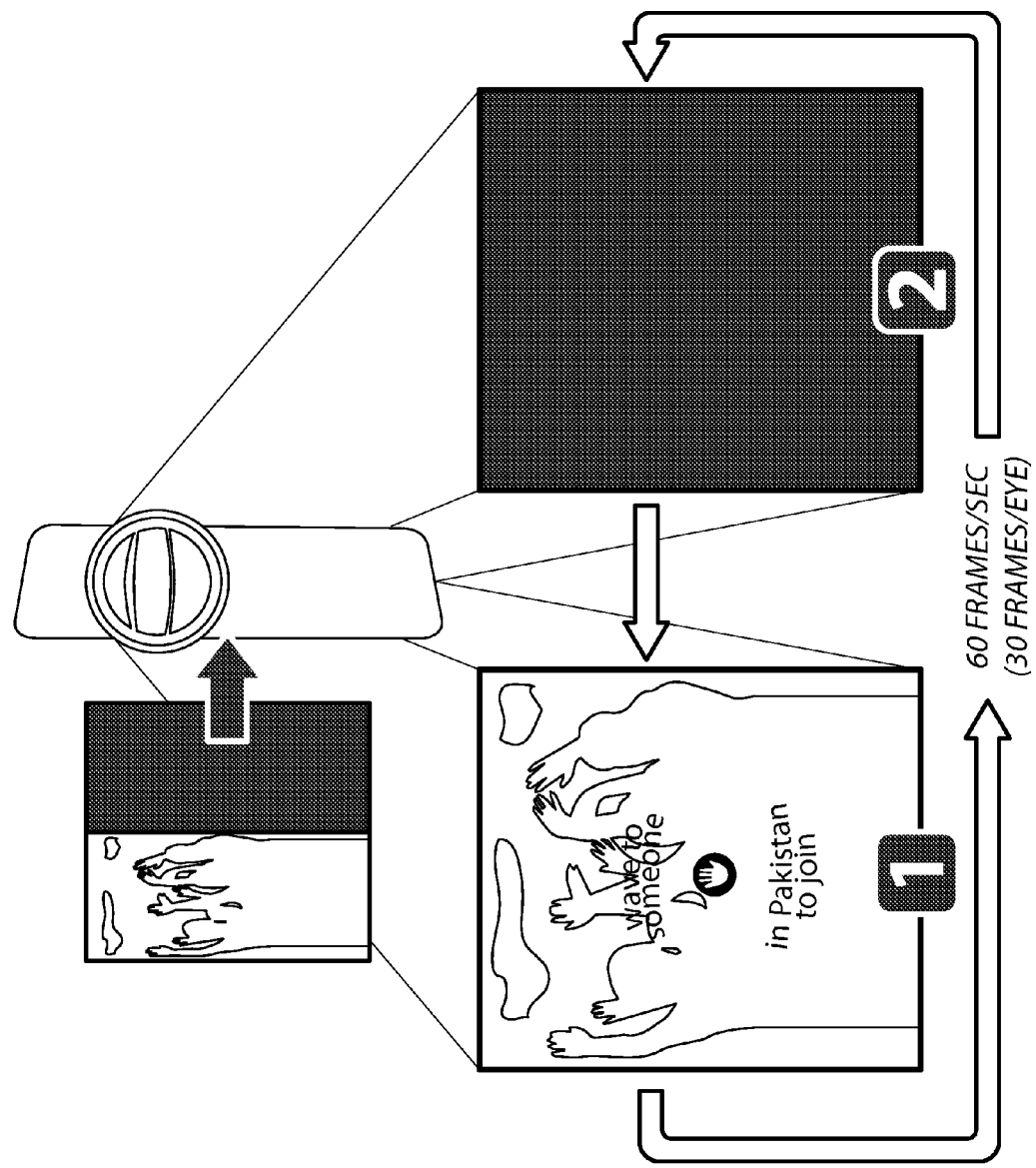
FIG. 2 is a schematic view of the projection details.
Figure 3:
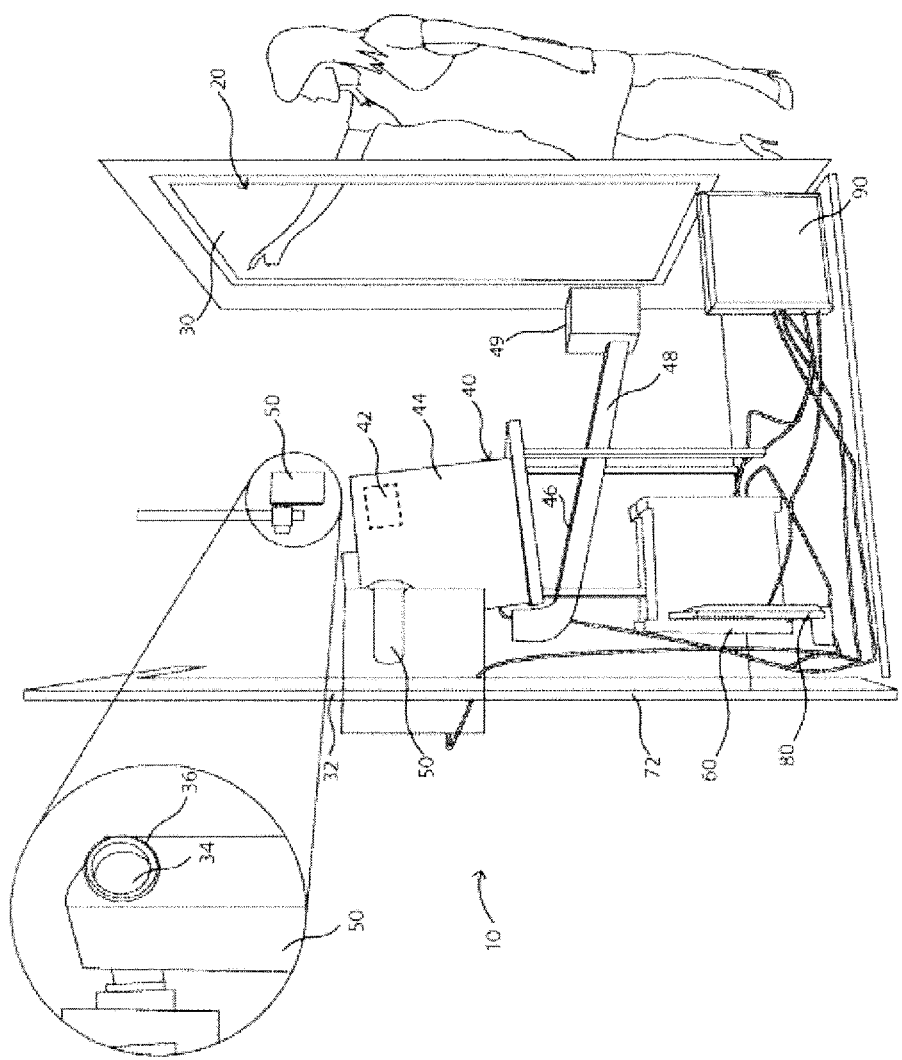
FIG. 3 is a perspective schematic view and a detail portion of the camera according to one embodiment.
Figure 4:
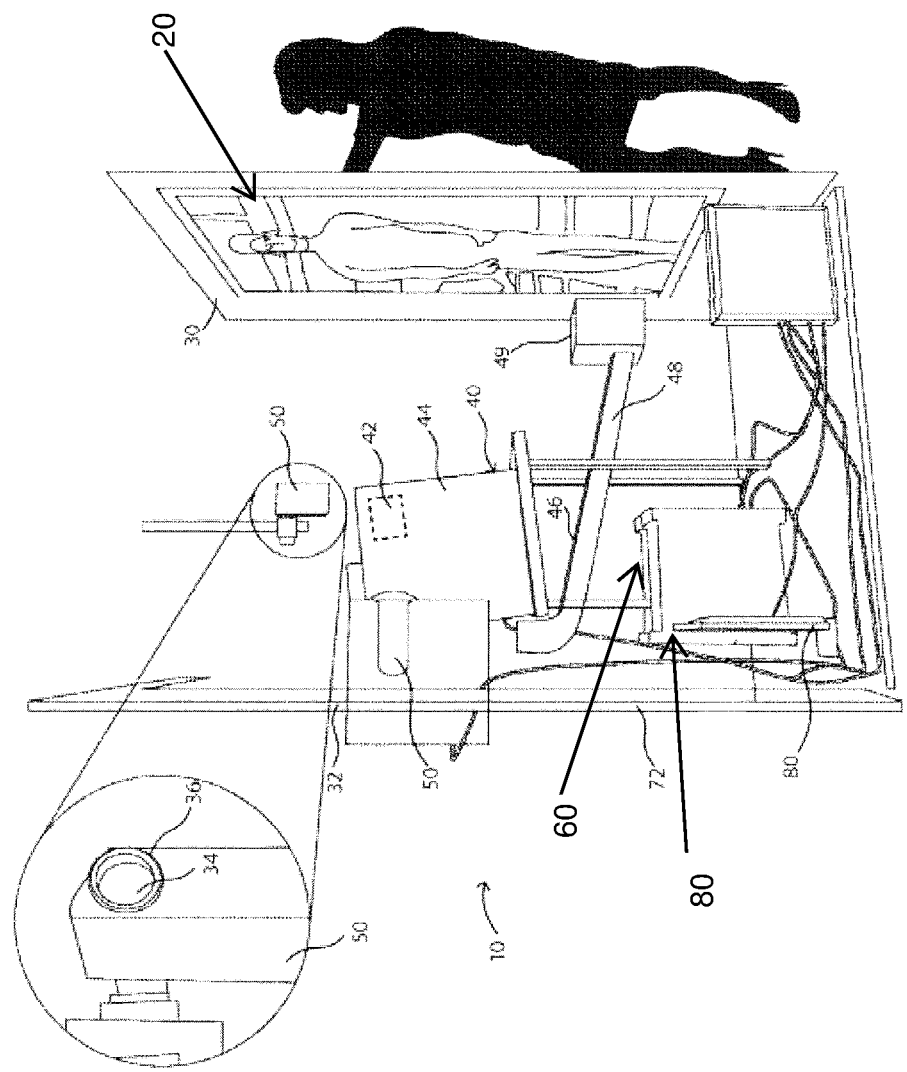
FIG. 4 is a perspective schematic view and a detail portion of the camera according to one embodiment.
Figure 5:
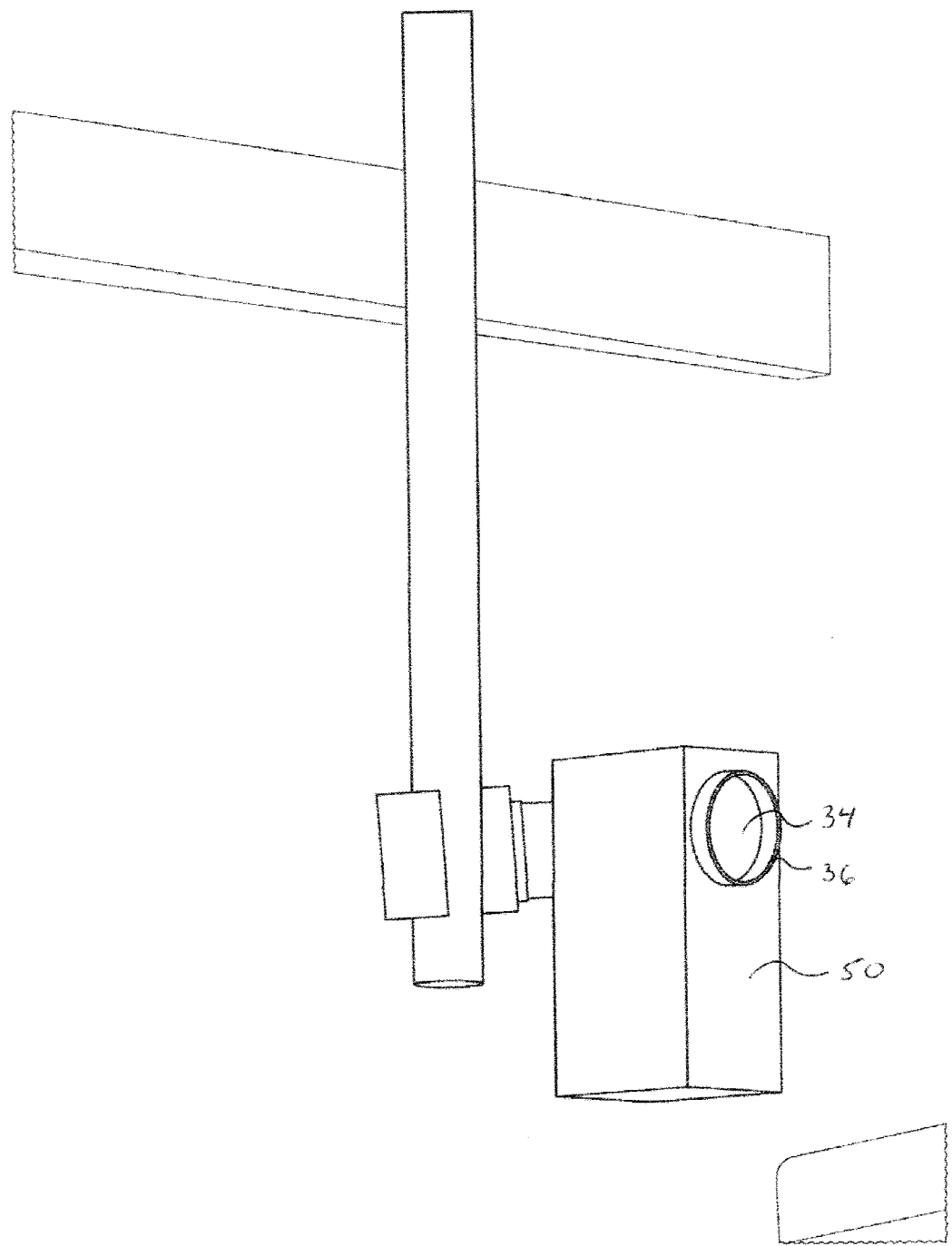
FIG. 5 is a perspective schematic view of a detail of the camera and mounting assembly.
Figure 6:
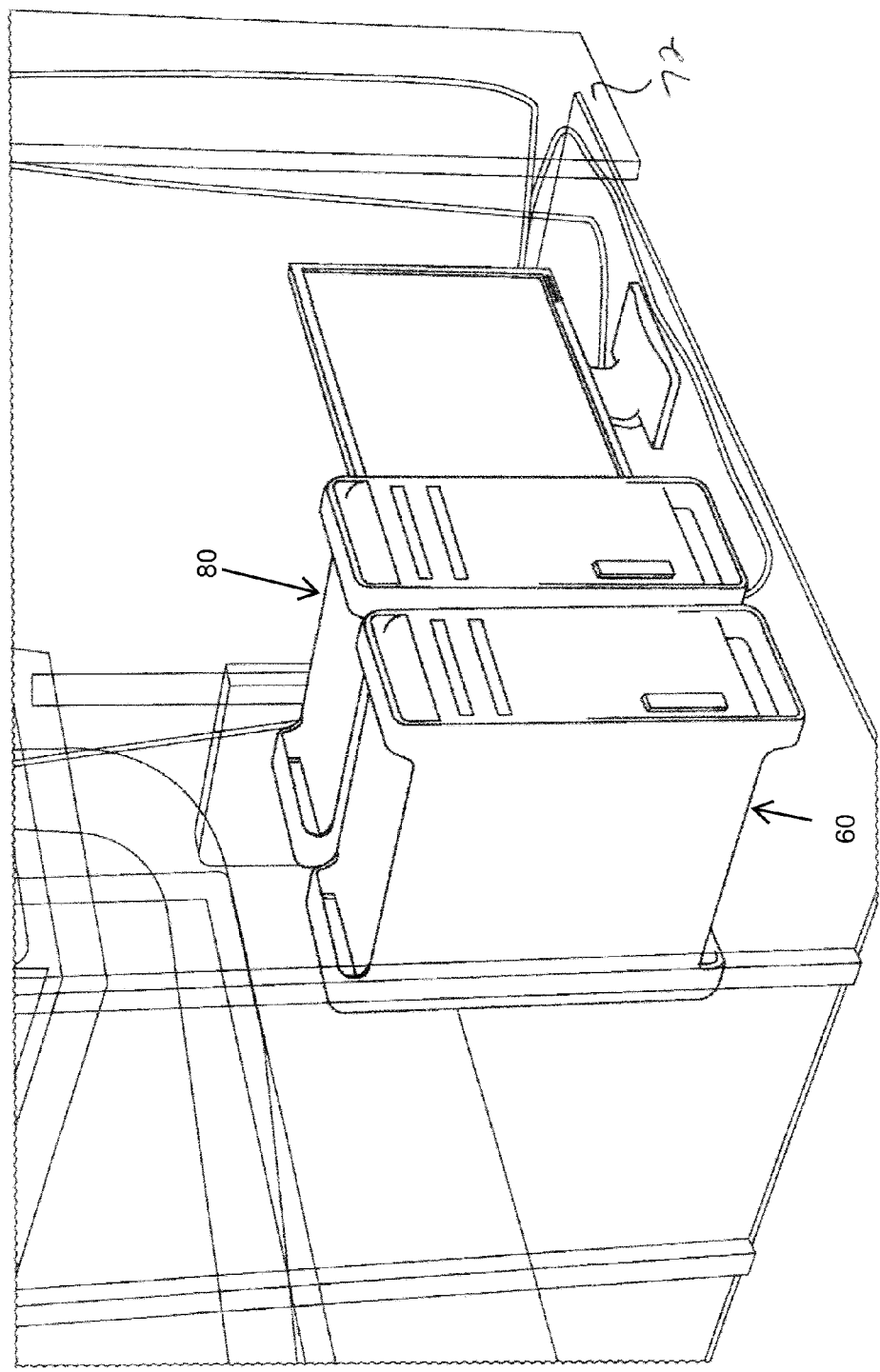
FIG. 6 is a perspective schematic view of a portion of the apparatus showing various computer-related components.
Figure 7:
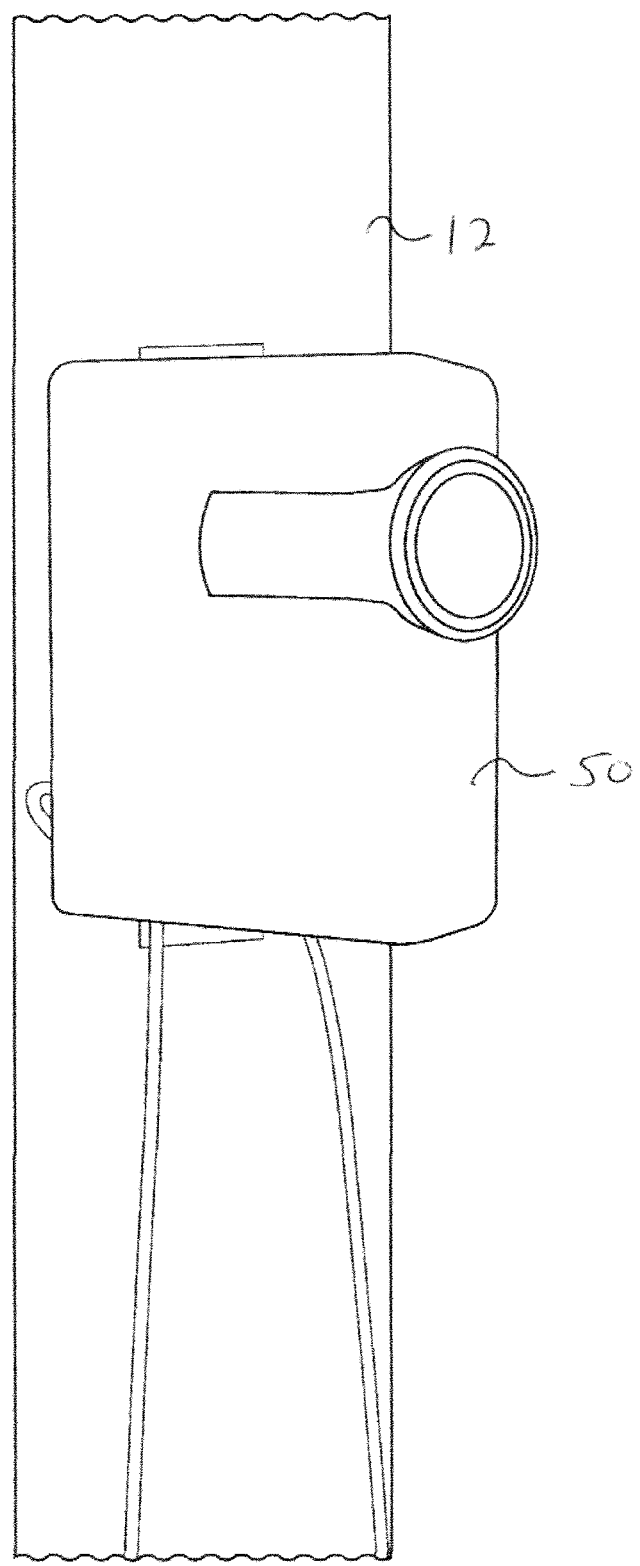
FIG. 7 is a perspective schematic view of a detail of the camera.
Figure 8:
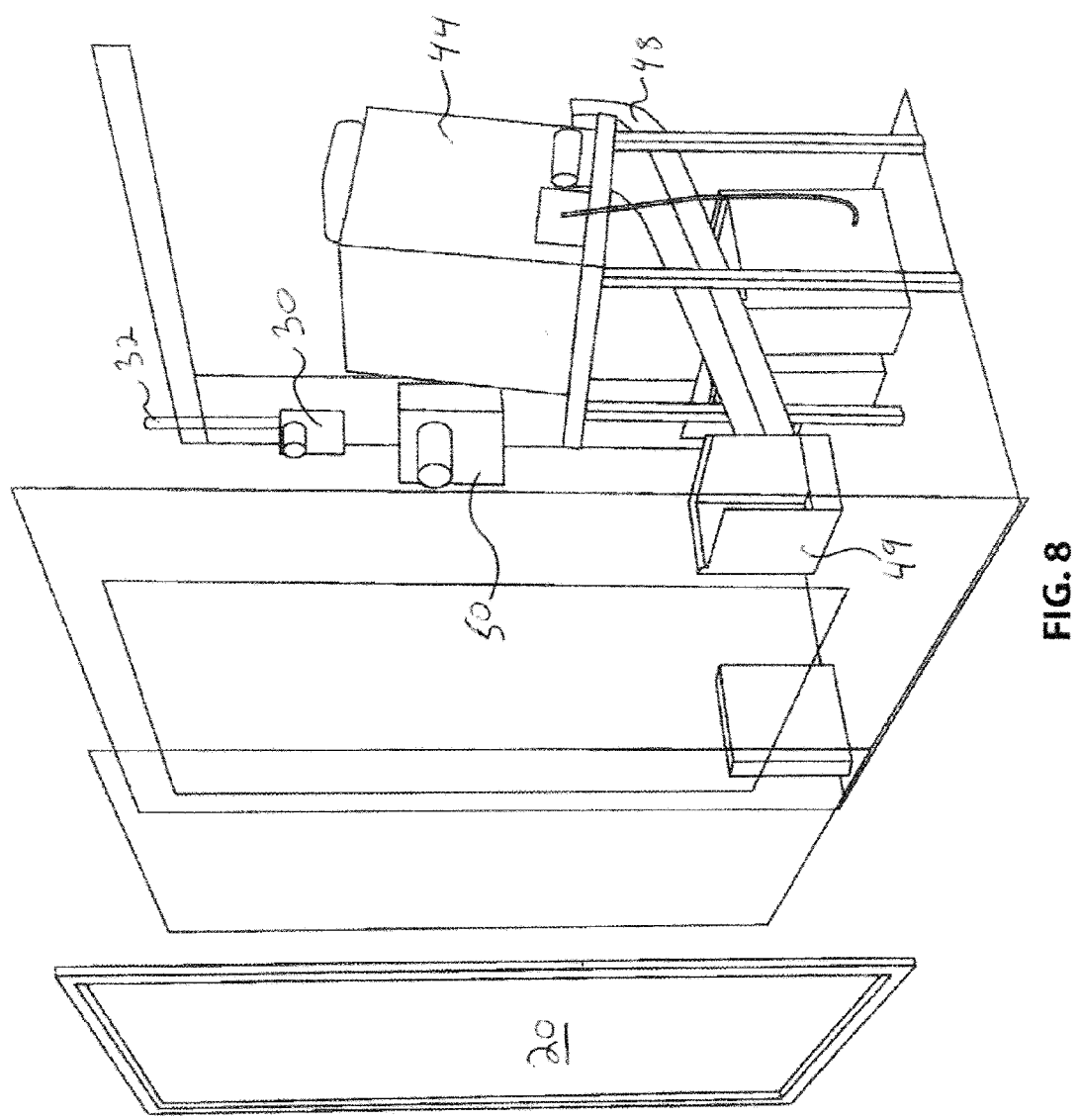
FIG. 8 is a partially exploded perspective schematic view of the front screen.
Figure 9:
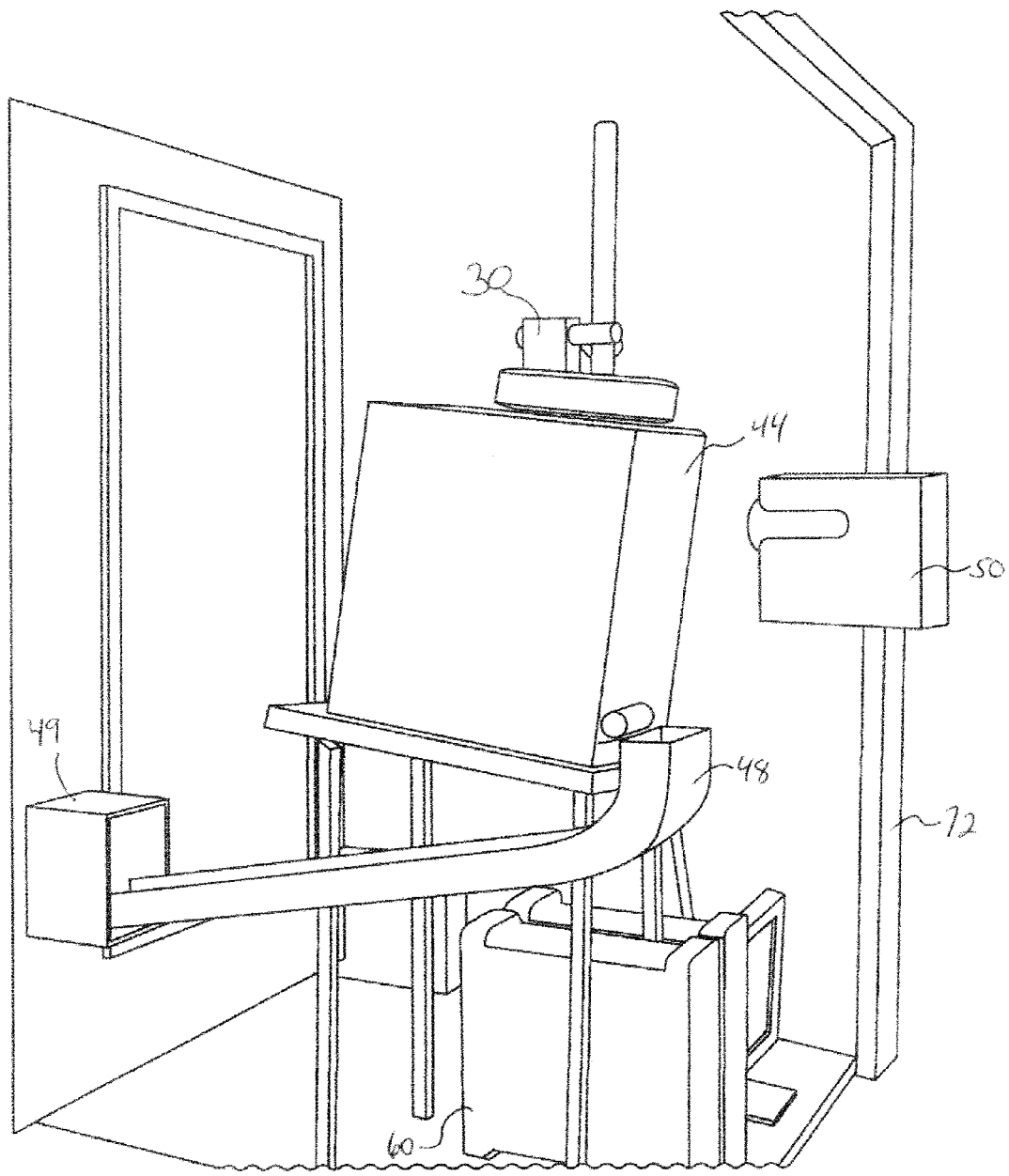
FIG. 9 is a left side perspective schematic view of a detail portion of the apparatus.
Figure 10:
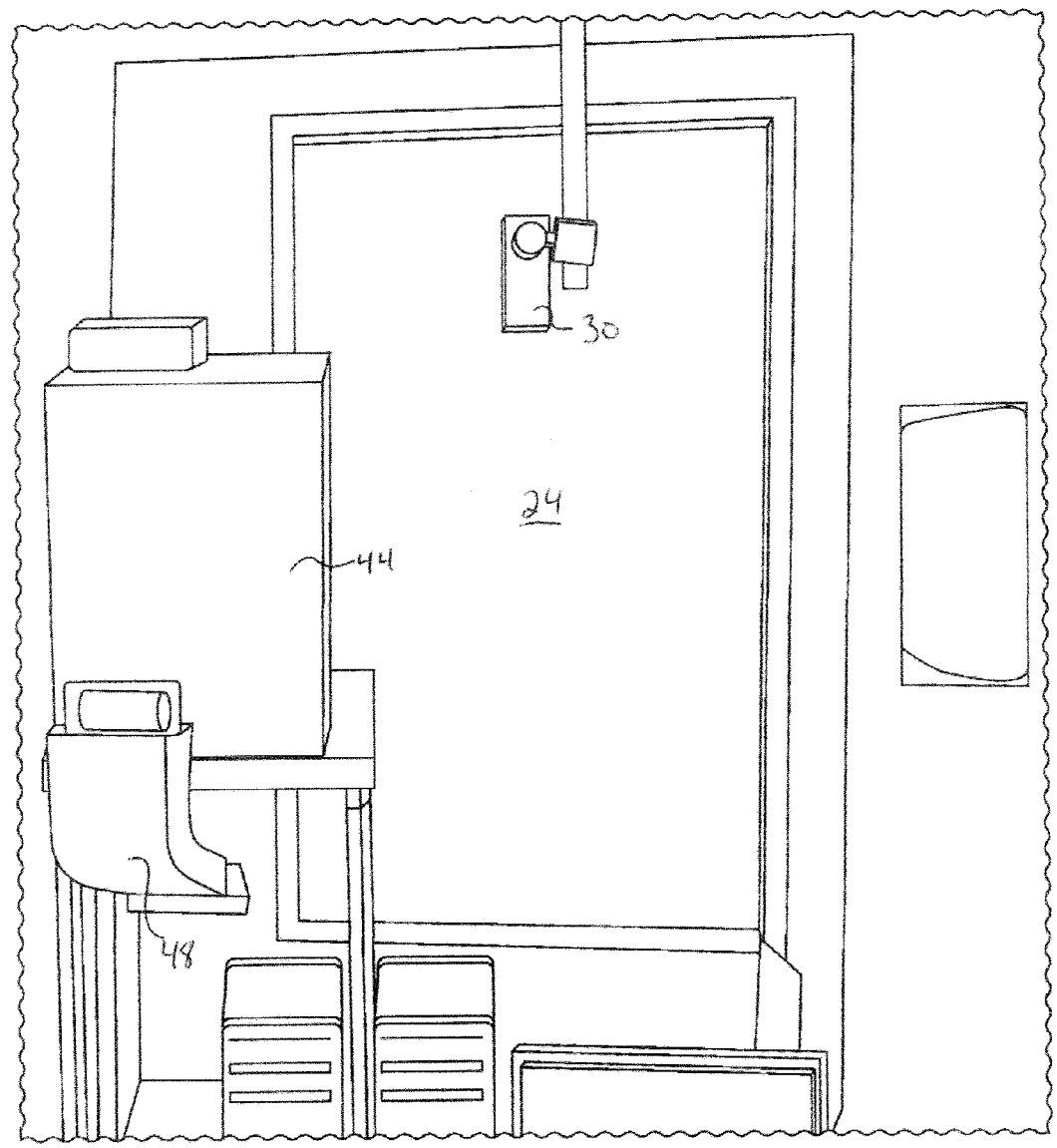
FIG. 10 is a rear perspective schematic view of a detail portion of the apparatus.
Figure 11:
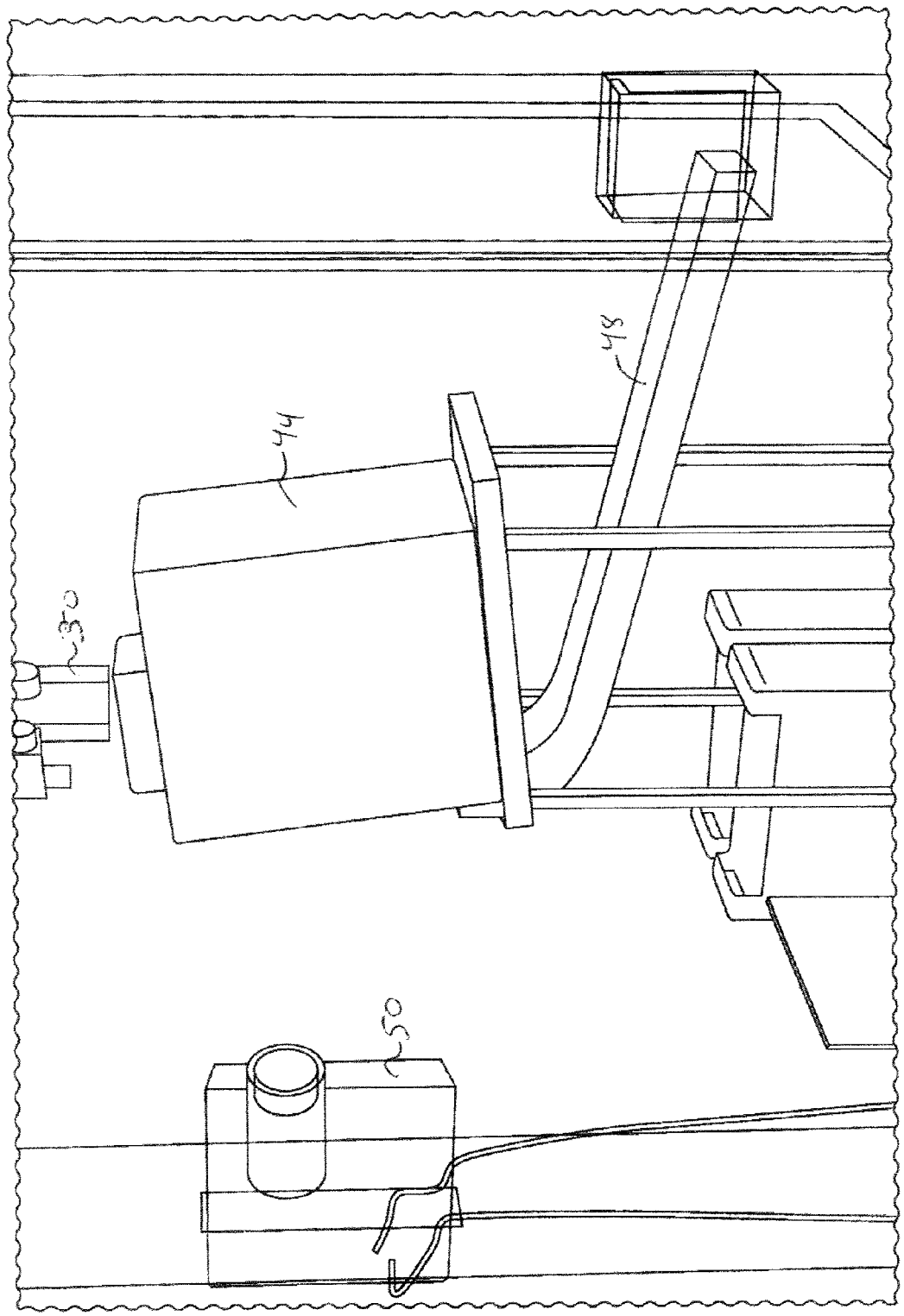
FIG. 11 is a right side perspective schematic view of a detail portion of the apparatus.
Figure 12:
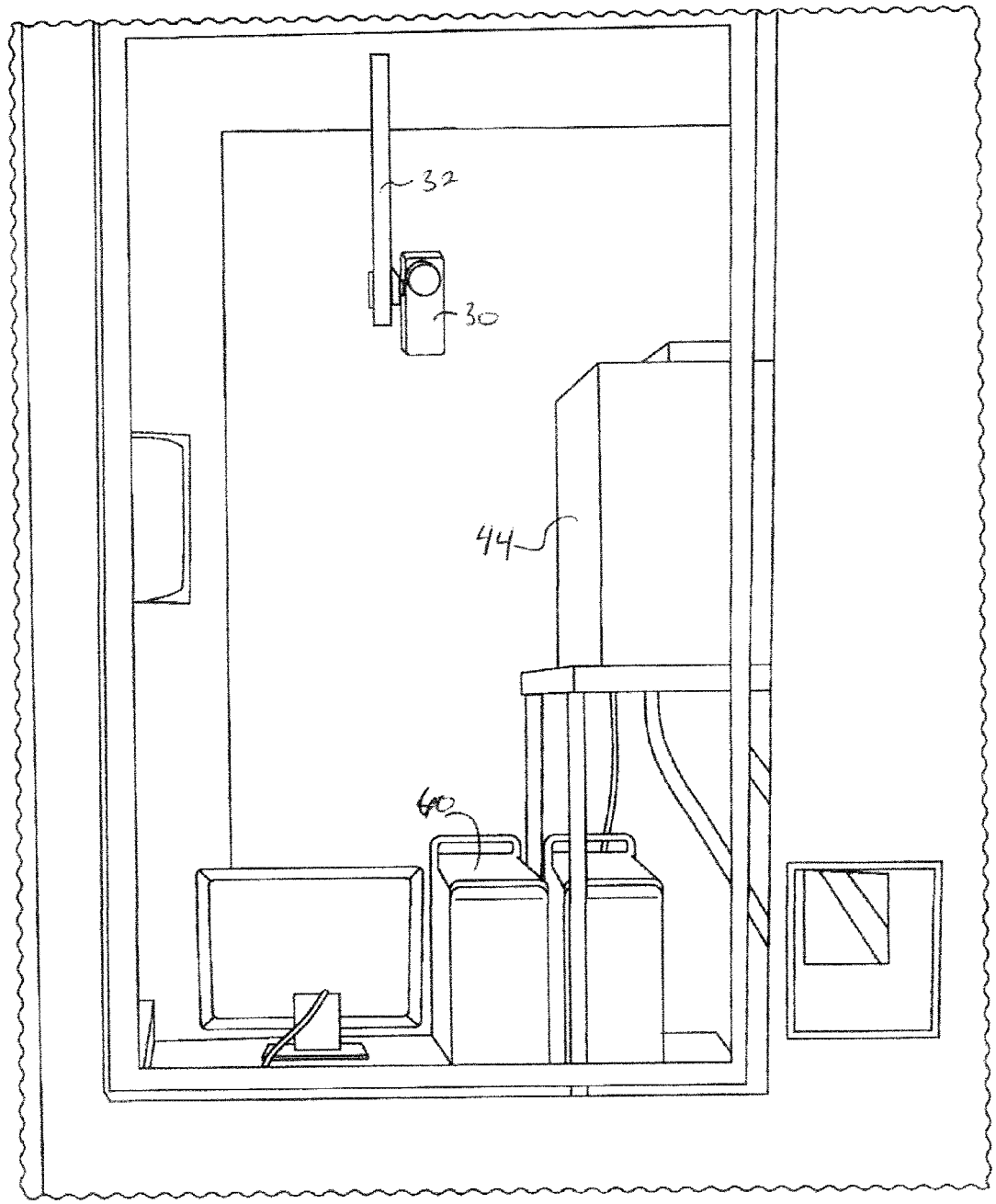
FIG. 12 is a rear perspective schematic view of a detail portion of the apparatus.
Figure 13:
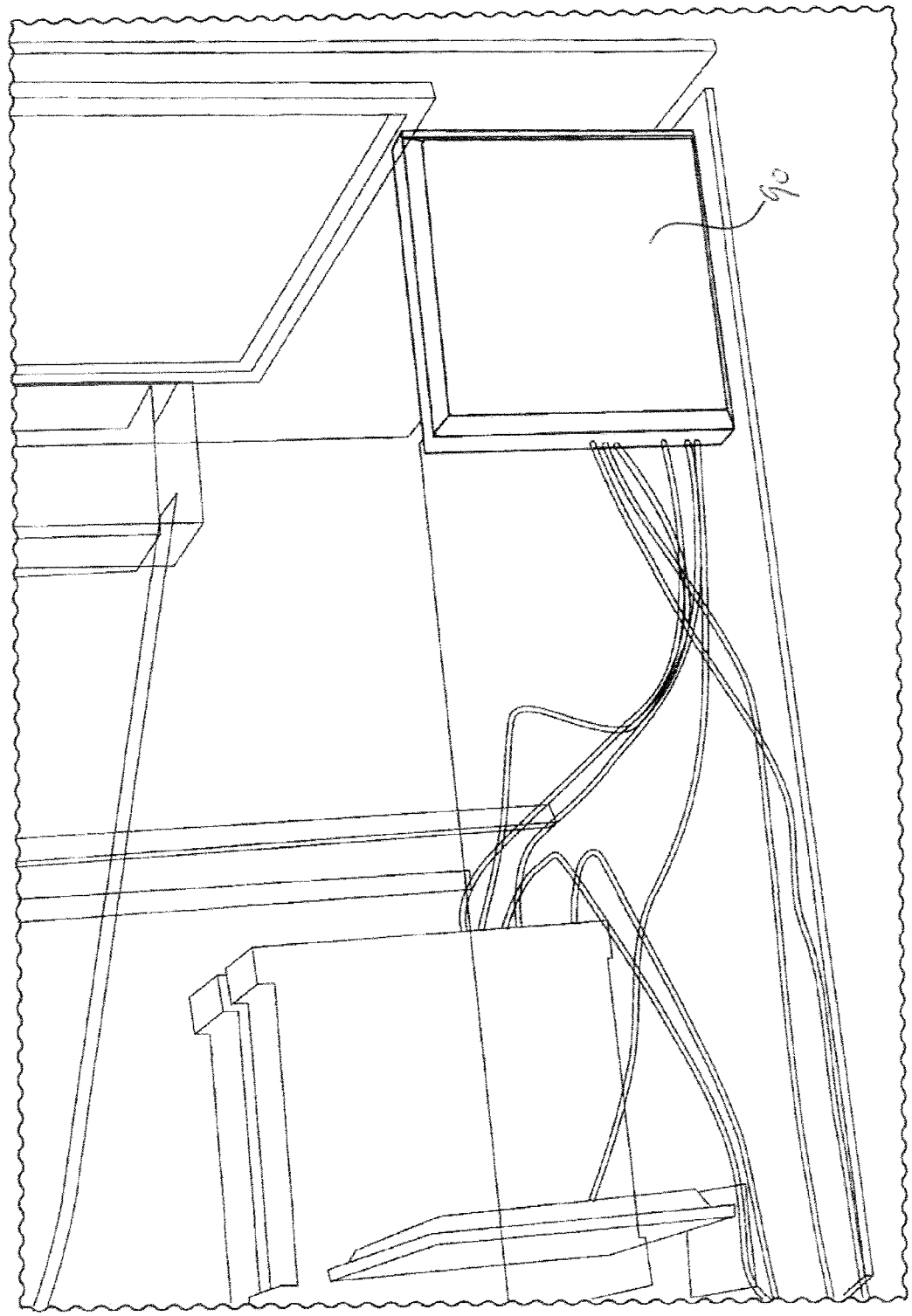
FIG. 13 is a detail view of a portion of the wiring of the apparatus.
Figure 14:
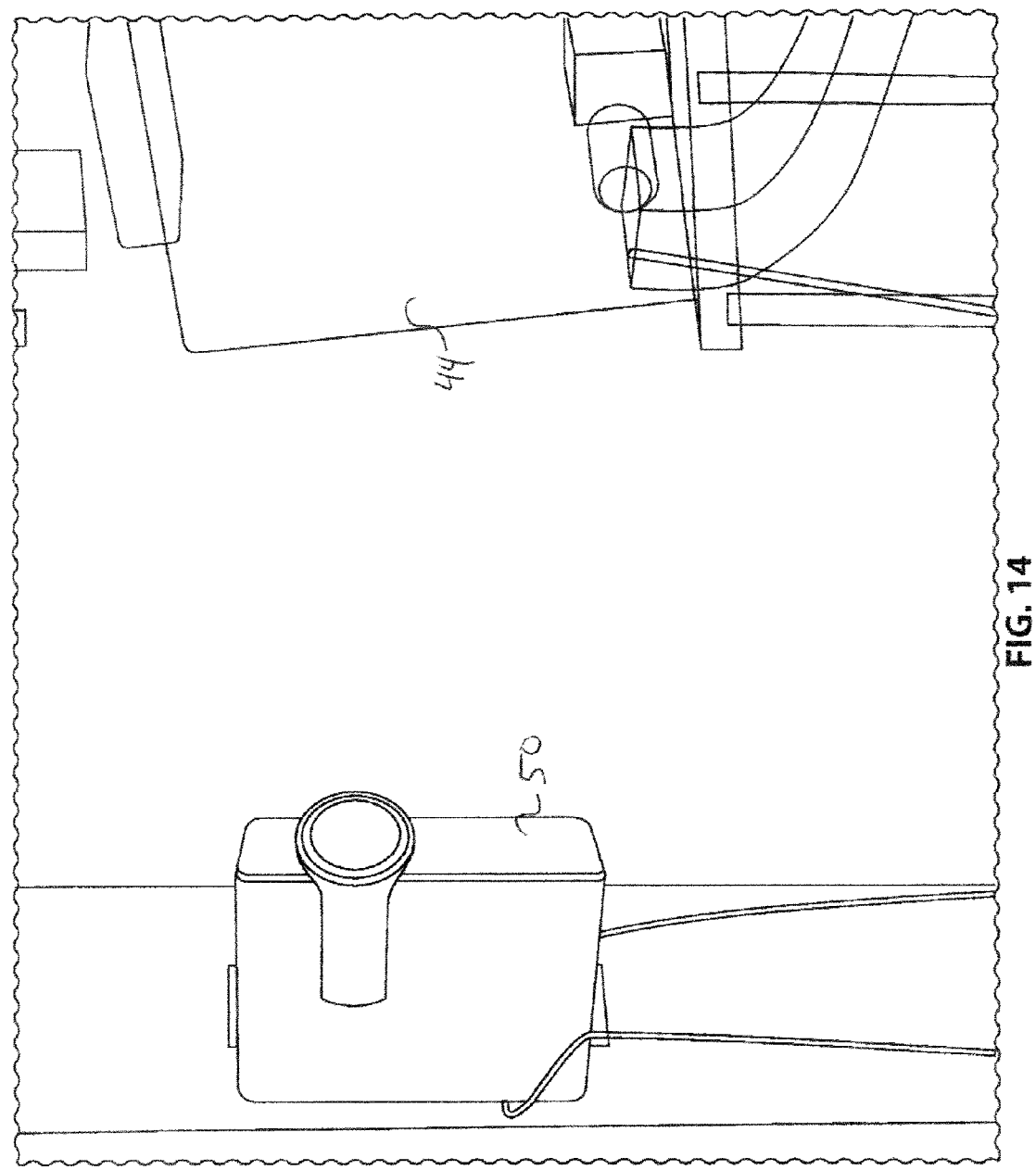
FIG. 14 is a side view of the projection apparatus.
Figure 15:
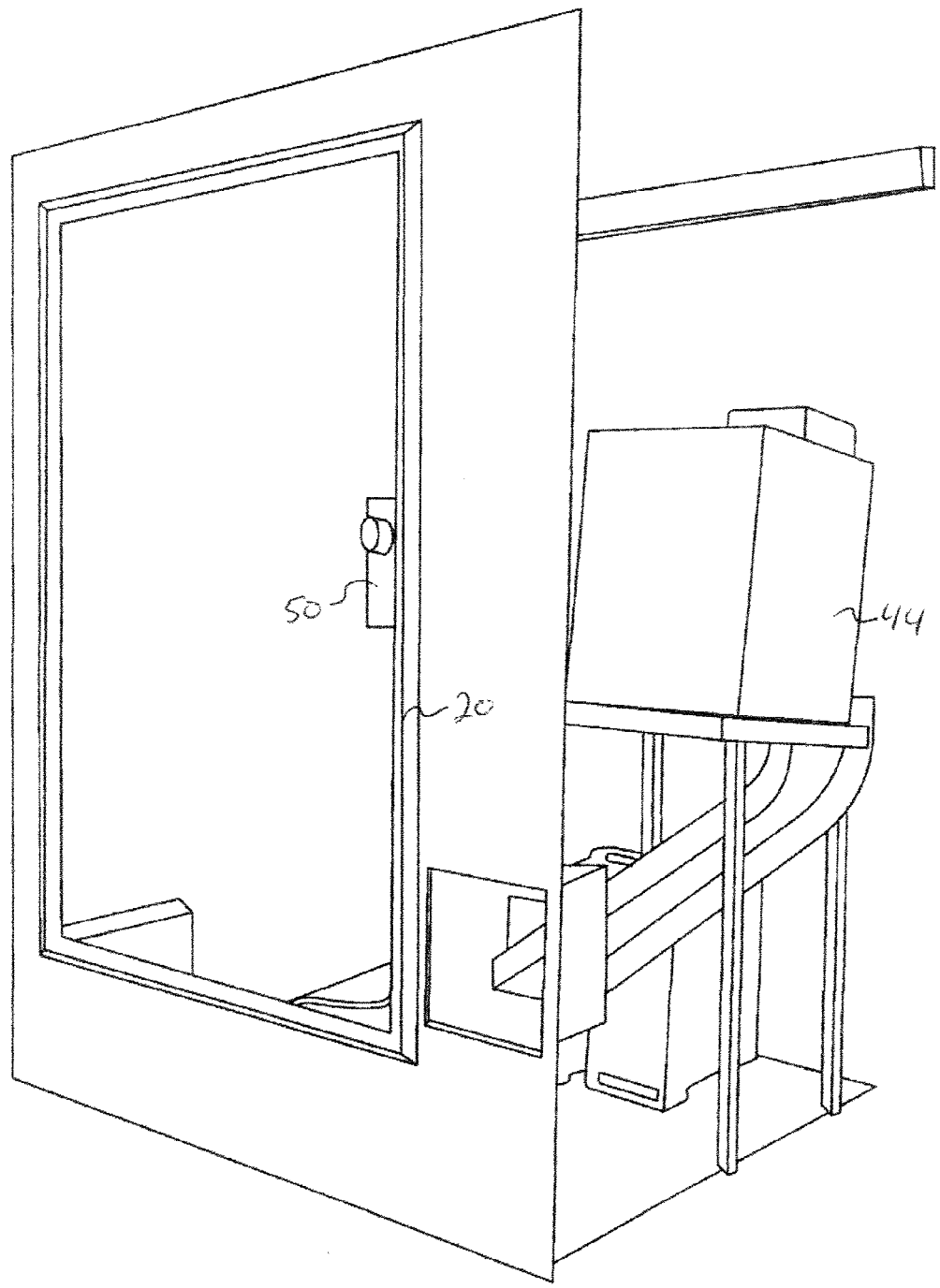
FIG. 15 is a front perspective view of the projection apparatus.
Figure 16:
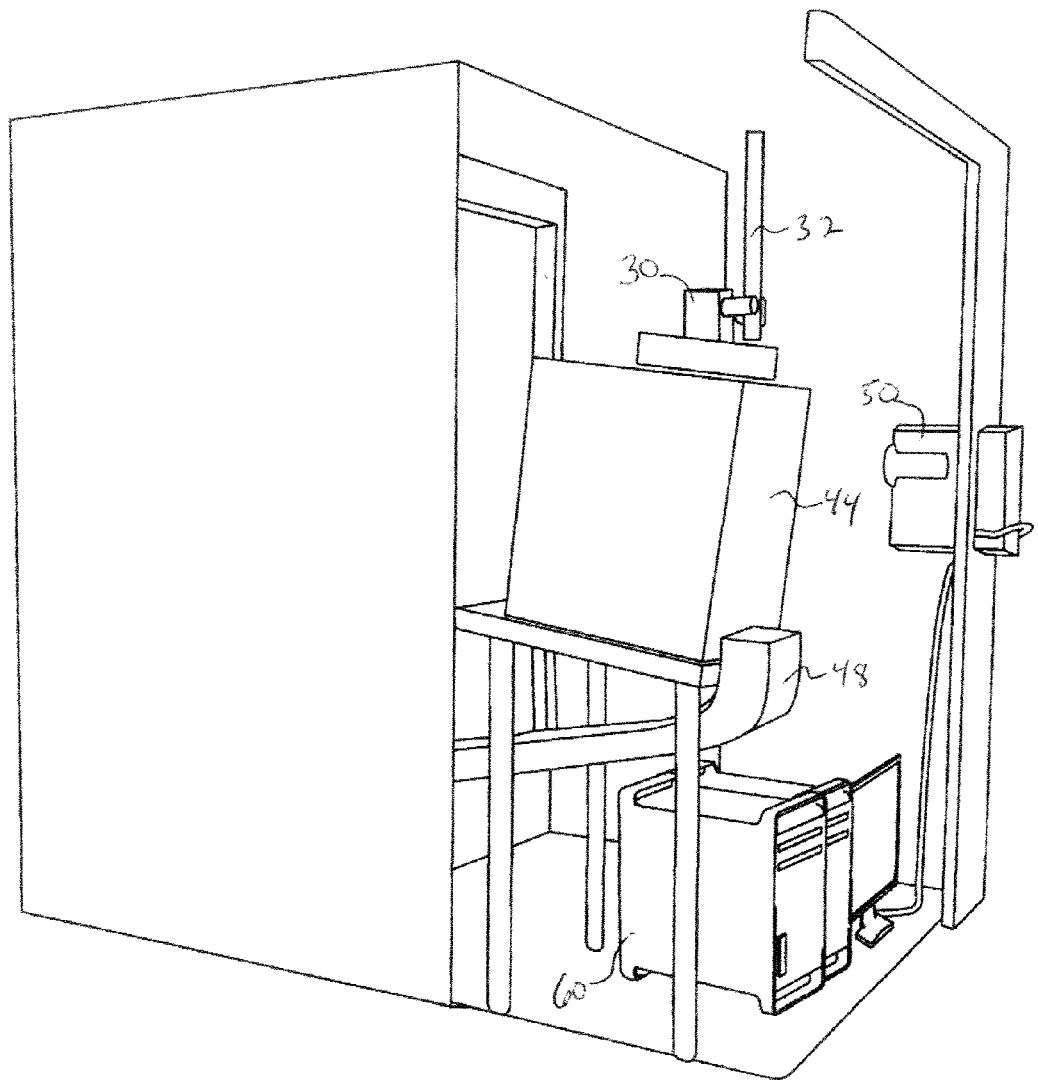
FIG. 16 is a left side perspective view of the projection apparatus featuring the computer components layout.
Figure 17:
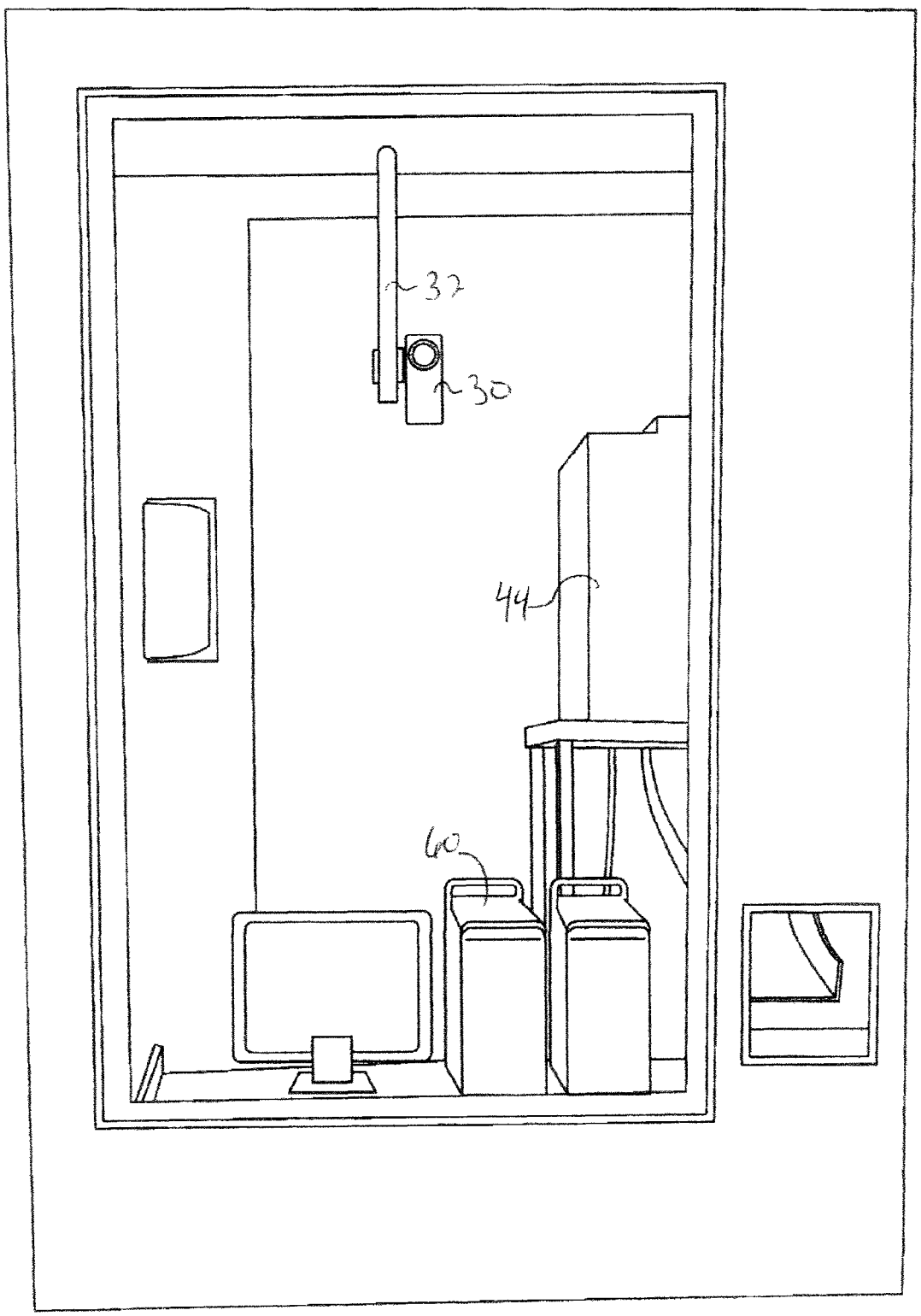
FIG. 17 is a rear perspective view featuring the projection lens, computer monitor and computer towers.
Figure 18:
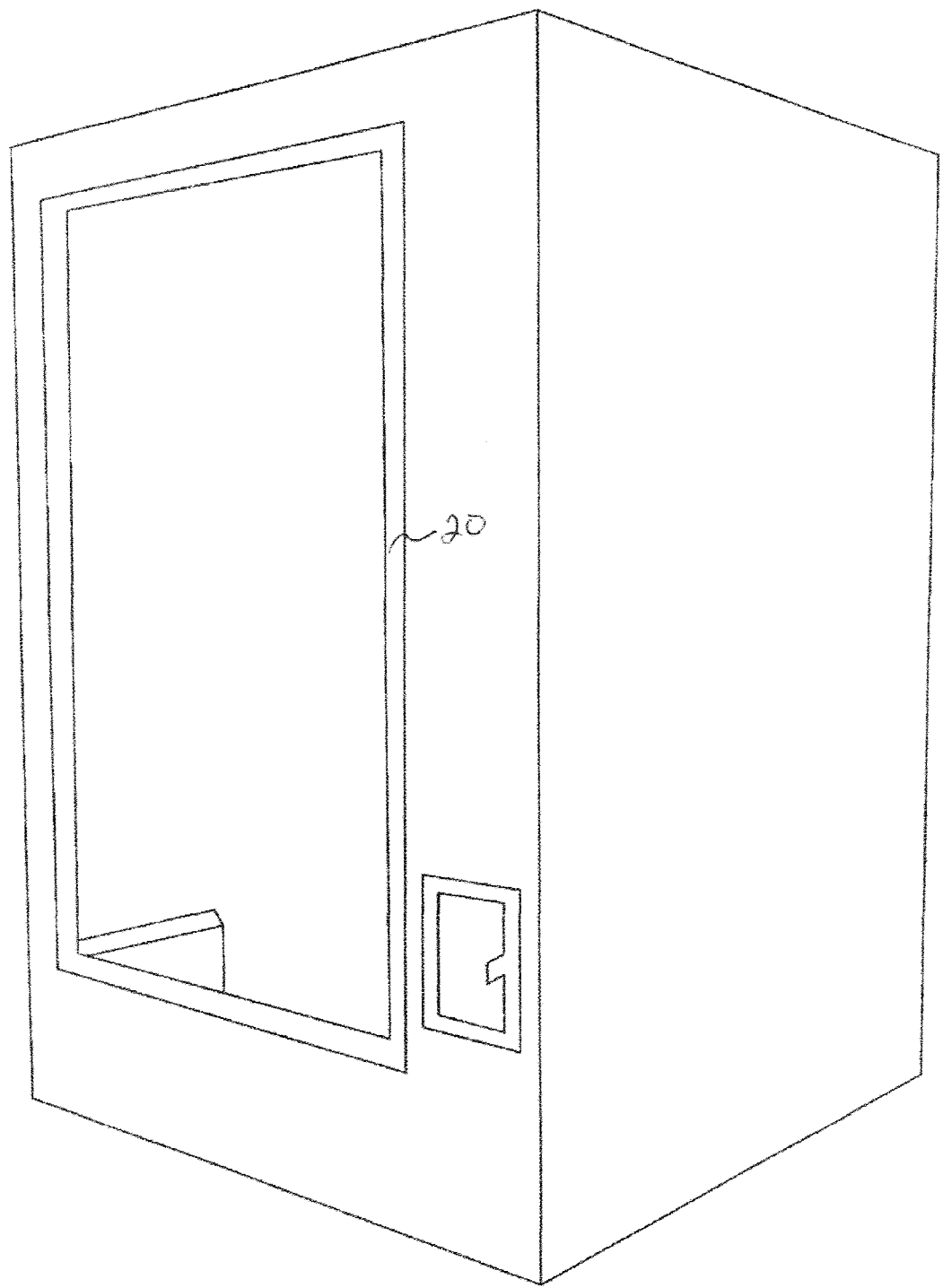
FIG. 18 is a perspective view of the housing of the apparatus.
Figure 19:
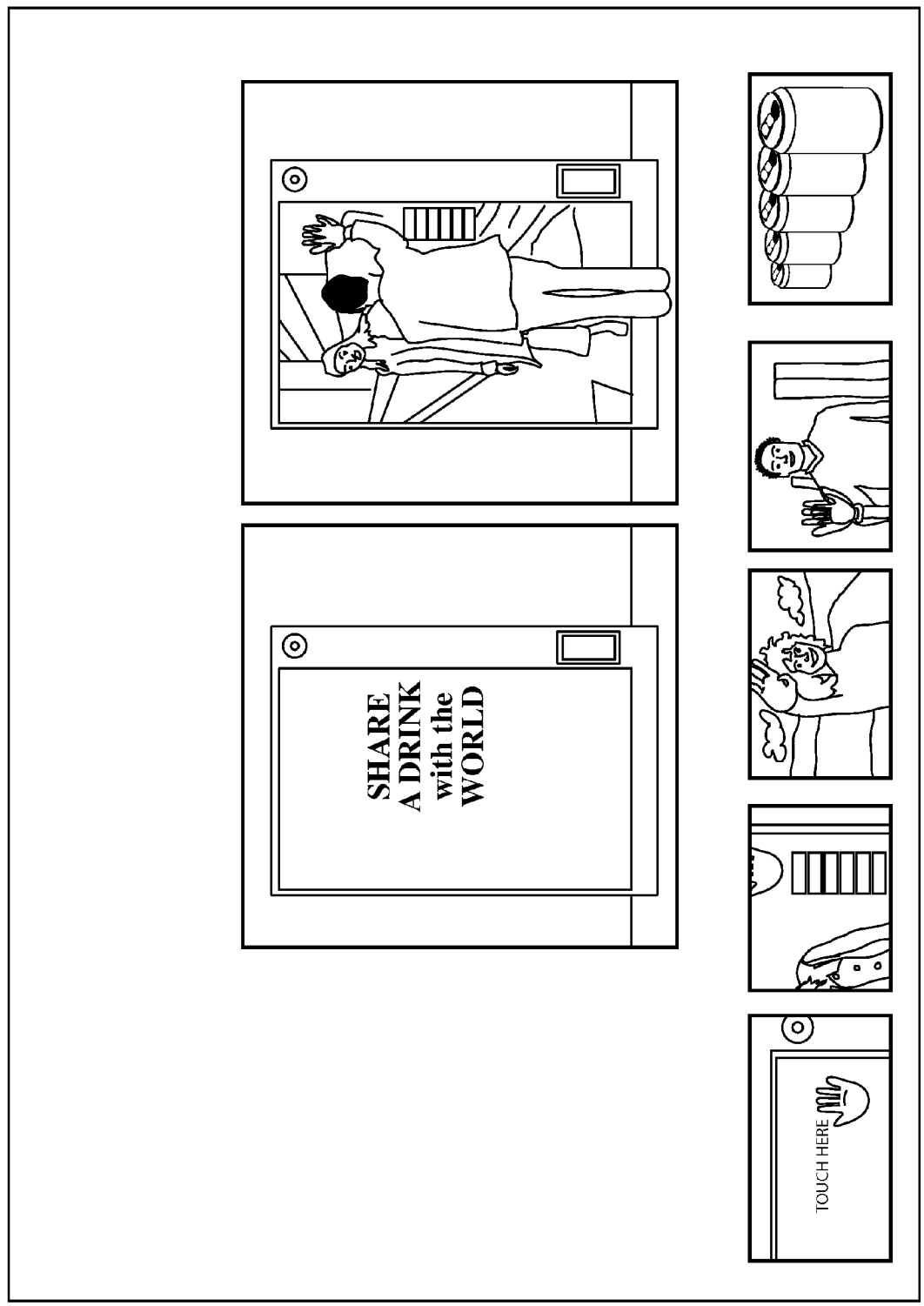
FIG. 19 is a pictorial illustration of various panel displays.
Figure 20:
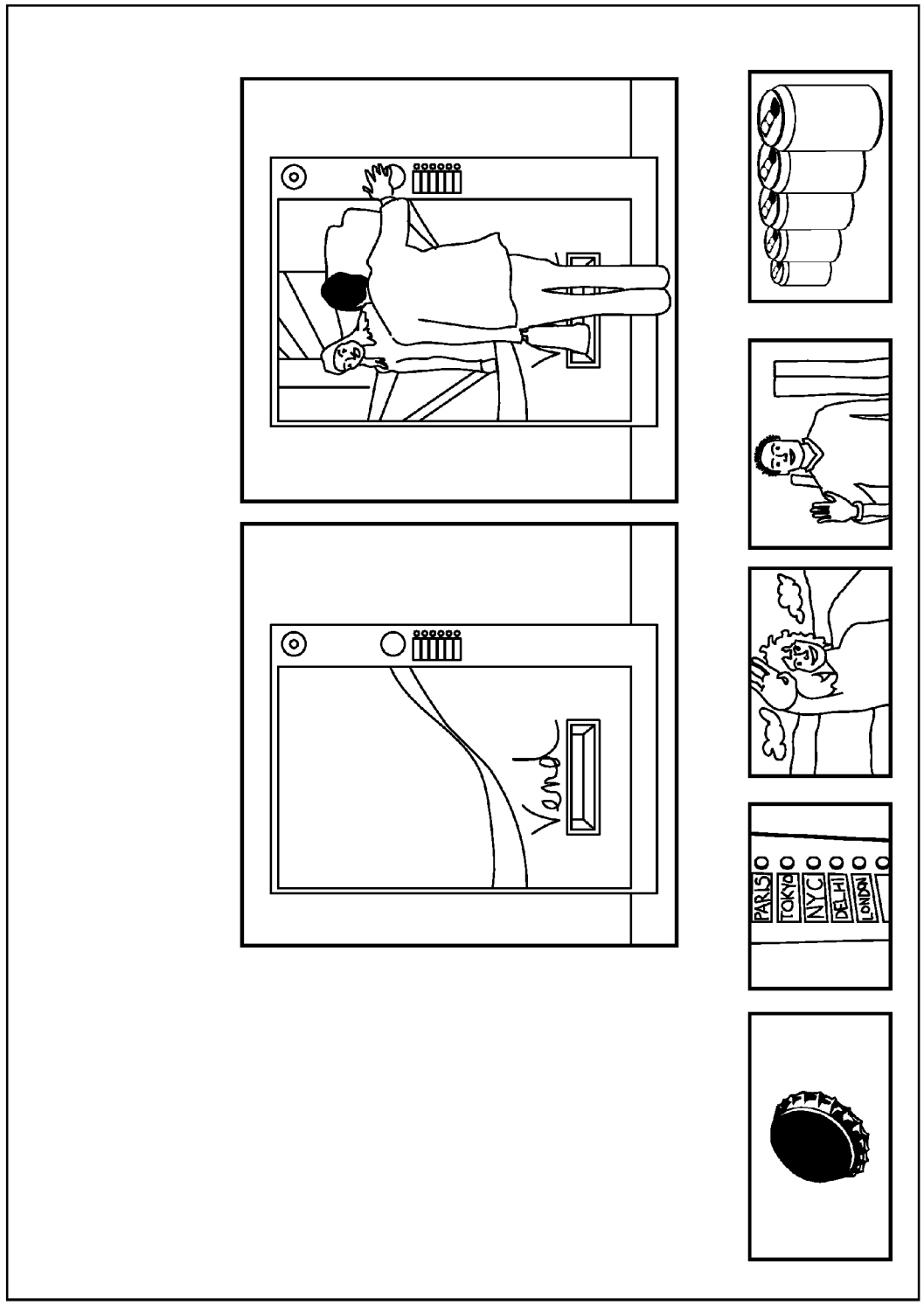
FIG. 20 is a pictorial illustration of various panel displays.

There are various ways for communication between two remote persons to occur, including, for example, the use of voice and video in combination. Conventional video conferencing has been limited to computer devices, such as, for example, mobile devices and large audio visual devices. The use of such services is generally between two parties who have previously planned to meet via video conference and/or have some familiarity with each other and may, for example, be expecting contact from at least one of the other parties. Video conferencing has also been historically been associated with software and/or hardware which may create a price point limiting the possibility of public or free use.

In one exemplary embodiment, the use of point-to-point public communication may be employed with at least one other service and/or good provisioning device and may, for example, allow for the remote communication between at least two individuals. The communication device may be of any size appropriate for allow communication between the at least two individuals and capable of being associated with the service and/or goods device. For example, a screen may range in size from a small wrist sized screen to a large screen which may substantially encompass at least some portion of the service and/or goods device.

Such a device may take any form and provide and/or deliver any number of services and/or goods. For example, a device may provide advertising, news, information, transaction capabilities, such as, for example, banking and bill pay, and/or other forms of communication. Similarly, a device may provide goods, such as, for example, consumable items from vending machine, tickets for an event and/or transportation, certificates, consumer goods, and/or the like. Further, a device may be a kiosk and may, for example, provide free access to a communications device and/or similarly provide information through the use of advertising and other economic tools, such as incentives, to make access to the communication services "free."

In an embodiment on the present invention, at least one communication device may be associated with a vending machine dispensing food items, such as, for example, soda. The communication device may be the size of a small mobile device screen and may preferably be substantially the size of the front of the vending machine. Although a screen may be typically planar with limited to one side of a device, a plurality of screens may be employed to serve the same or disparate functions. Similarly, screens may be of those types known to those skilled in the art such as, for example, curved screens and multi-surface screens. Visuals provided through the device may also be executed through holograms and other less tradition means.

Activation of the communication device may be triggered through a variety of mechanisms and/or triggers. For example, payment and/or dispensing of the service and/or product, such as a soda in the proceeding example, may allow for a user to interact with the communications device. In one exemplary embodiment, the communication device may also be activated by user interaction and/or the presence of the user. For example, and as discussed below, the communication device may be integrated with a touch screen portion, allowing for a user to activate the communication device by touch. Similarly, a motion detector or an infra-red system, for example, may be used to detect the proximity of a potential user and may, for example, initiate at least one alert to draw the attention of a person within a certain proximity of the device.

By way of non-limiting example only, a near infra-red detection array may be included with the present invention and may allow for the detection of a person within a predetermined range of the device, such as, for example, two (2) feet from the device, preferably at least a side allowing for commerce, and may provide a specific distance within the tolerance range of the detector. Other proximity locators and/or activation queues may include, for example, the use of near field communication associated with a mobile device, the use of visual indicia, such as QR codes, SMS, vibration sensors, sound receivers, and the like.

Once activated, a predetermined time limit and/or activation time may be set for various features of the device. For example, communication access may be made available after the purchase and/or dispensing of a good or service and may be provided for a predetermined period of time. In one exemplary embodiment, once something is acquired from a vending machine, the communication device associated with the vending machine may be accessible for a predetermined period of time, such as, for example, three (3) minutes. Although any time may be set, one that allows for a higher number of persons to interact as desired with the communications device is desirable.

A time limit, if one is imposed, may also be variable and/or set in accordance with one or more variables associated with the communications device and/or the vending machine. Such variables may include the amount spend at the vending machine, the number of goods and/or services purchased, the viewing and/or exposure to advertising, and the like. By way of non-limiting example only, a customer of the vending machine may be "rewarded" with an amount of time relationally based on the money spent at the vending machine. Similarly, the watching of an advertisement or other information may provide a certain amount of communications time.

In one exemplary embodiment, the activation of the communications device at a first vending machine device, for example, may provide for activation of a communications device at at least one second vending machine device. In this way, for example, any value necessarily provided by a user of the first device may allow for a second user to respond in kind based on the same value. Of course, as would be apparent to those skilled in the art, the line of communication between devices may always be active and may, for example, provide at least some indication of activity which may be viewed through the at least second device. For example, to draw a user to use and/or activate the communications device on a first device, an image, such as a real-time video feed, may be presented on the communications device of the first device and may, for example, be slightly transparent and/or depixelated to provide less of a display than would otherwise be available during full activation and/or use of the communications device. In this way, an indication may be provided to a potential user that, for example, another user is proximate to the at least second device and/or is ready to or is using the communication device at the at least second device. Although the present invention may come in various forms, shapes and sizes, more detailed embodiments are discussed below.

FIG. 1 and FIGS. 18-20 show exemplary embodiments of an apparatus 10 which may include a frame 12 to which various components may be mounted. A touch screen panel 20 may be an interactive touch-activatable screen. In exemplary embodiments, the touch screen panel 20 may be on any semi-rigid material, such as, for example, an acrylic and/or acrylic-based material. In exemplary embodiments, the touch screen panel 20 may have at least one infra-red (IR) beam generator associated therewith that emits a grid of IR beams that are used to track hand and finger movement. A touch screen panel may be of any size, as described above, and may preferably be of a standard size, such as, for example, 65 inches in diameter. For example, a 65 inch Screen Tech rear projection screen may be used in conjunction with a 65 inch ZaagTech IR panel and with a 65 inch Screen Solution International IR panel touch screen frame. Using standard sized equipment may help keep costs down and allow for the production of the present invention using primarily off the shelf components.

A screen 24 may be positioned generally co-planar with the touch screen panel 20, and in exemplary embodiments generally overlays the touch screen panel 20. In exemplary embodiments, the screen 24 may be an acrylic material. In exemplary embodiments, the screen 24 may be a polarized acrylic material. The material may be sufficiently transparent so that one can see through it, but still have the ability to hold a clear image. A polarized acrylic material for the screen 24 may allow projected images to be seen at various angles (or a greater off-axis angle in different directions) because of the way that the material holds and distributes light.

A camera 30 may be, in exemplary embodiments, a high definition webcam. The camera 30 may be adjustably mounted on a post 32 to the frame 12. Although not shown, post 32 may extend along the full height of the screen 24. The camera 30 has a lens 34. One lens 36, such as that used in a pair of active shutter "3D" (three dimensional), may be placed over the webcam lens 34. "Active shutter" is also known in the art as "alternate frame sequencing" or "alternate image." The lens 36 may contain a liquid crystal layer sandwiched between two transparent outside layers. The liquid crystal layer may become opaque when voltage is applied, being otherwise transparent. The lens 36 may be controlled by a timing signal that may rapidly apply and unapply voltage to the lens 36 so that the lens 36 switches between transparent and opaque. The lens 36 only "sees" the black (opaque) frames that are projected (as discussed further herein below), not the frames with the video feed and any animation. This allows the webcam to "see" through the projected image that the user is seeing. Such a technique may reduce or eliminate "ghosting" of the image(s) and may reduce any noticeable "flicker." Similarly, as discussed herein, a plurality of cameras may be used to enhance image quality, provide various angles of views, and to provide a fail-safe if at least one camera were to fail, for example.

In one exemplary embodiment, a portion of code such as, but not limited to, the following may be employed to alternate between opaque and non-opaque screen presentations:

```
import flash.events.Event;
addEventListener(Event.ENTER_FRAME, onEnterFrame);
//seeThrough is the black frame that is enabled or disabled every other
frame to replace the video image
var evenOdd:uint = 1; //determines if we are on an odd or even frame.
function onEnterFrame(e:Event) {
        if (evenOdd == 1) {
                evenOdd = 2;
                seeThrough.visible = false;
        } else {
                evenOdd = 1;
                seeThrough.visible = true;
        }
}
```

As would be appreciated by those skilled in the art, the alternating of frames may allow for the human eye to be tricked into seeing what appears to be a steady-state image when the image is being projected at less than a full amount of possible frames per second. For example, the human eye generally perceives 30 frames per second as a steady-state image. High definition and other related standards allow for the projection of images at a rate of 60 to 120 frames per second. In one exemplary embodiment, a rate of less than 60 frames a sec, but greater than 30 frames a second, may be employed to allow for the alternating of at least one projected image to allow for at least one camera placed behind screen panel 20 to collect at least 30 frames per second of video for display at another, preferably remote, screen.

In exemplary embodiments an optional dispensing (or vending) apparatus 40 (akin to the device discussed above) may be associated with the apparatus 10 and in exemplary embodiments may be disposed inside the apparatus 10. In one exemplary embodiment a dispensing apparatus 40 may be a refrigerated soda can vending machine available from Koolatron (Ontario, Canada) that has been modified by associating a micro-controller 42 (available from Arduino) therewith to control the dispensing apparatus 40, such as, but not limited to, dispensing cans of beverages or other objects. The dispensing apparatus 40 may include a compartment 44 that may hold a number of dispensable objects 46, and a conduit member 48 for conducting an object 46 from the compartment 44 to a dispensing outlet area 49. In other exemplary embodiments, alternative dispensing apparatus known to those of ordinary skill in the art may be utilized, whether or not cooled, heated or room temperature, and to which a micro-controller 42 can be associated. The micro-controller 42 is in electronic communication (wired, wireless or otherwise) with a central processing unit (as described herein below).

A projector 50 may be mounted to frame 12. In exemplary embodiments, the projector 50 may be a short throw projector. In exemplary embodiments, the projector 50 may be a "3D" projector. In exemplary embodiments, the projector 50 may project video at 60 frames per second (though other rates may be used as would be appreciated by those skilled in the art). The projector 50 may project side-by-side or top-bottom 3D images onto the screen 24. The projector 50 synchronizes with the lens 36 to allow the camera 30 to detect recordable images through the screen 24.

In one exemplary embodiment, a portion of code, such as, but not limited to, the following Actionscript 3, may be employed to handle image rotation and top-bottom 3D mode:

```
stream_name = String(stream_name);
iStream = new NetStream(nc);
iVideo = new Video(1280, 720);
iStream.play(stream_name, "live");
iVideo.attachNetStream(iStream);
stageMC.addChild(iVideo);
iVideo.y = 1280;
iVideo.x = 720;
iVideo.rotation = 90;
iVideo.scaleX = -1;
private function init( ):void {
        arduino = new ArduinoInterface(10);
        stageMC = new MovieClip( );
        stageMC.x = 0;
        stageMC.rotation = -90;
        stageMC.y = 720;
        addChild(stageMC);
        stage.addEventListener(Event.ENTER_FRAME,
        enterFrameLoop);
        activityLoader = new Loader( );
        loadData( );
        setupDemo( );
        topBottom3dMode( );
}
private function topBottom3dMode( ):void {
        stageMC.scaleX = .5;
        stageMC.y = 360;
}
private function onReceiveCommand(e:NetConnectionClientEvent) {
        var command:String = e.infoObject.command;
        loadActivity(command);
}
```

A first central processing unit 60 is an encoding unit (and referred to as the "encoding computer 60"). The encoding computer 60 is in electronic communication with the camera 30, such as, but not limited to, a wired or wireless connection. The encoding computer 60 has a central processing unit, memory storage, and other components typical of a personal computer. The encoding computer 60 may receive and store information of the user, adjust the picture quality, compress a data feed, stream video to a remotely located server 70 (for example, a flash media server).

A second central processing unit 80 may handle the interactions with various components (and is also referred to as the front end computer 80). The front end computer 80 is in electronic communication with the dispensing apparatus 40, touch screen panel 20 and projector 50. The front end computer 80 handles the actuation of the touch screen panel 20, image projection and dispensing of objects 46. As would be appreciated by those skilled in the art, both first central processing unit 60 and second central processing unit 80 may be housed in the same unit and may, for example, share the same microprocessor.

In exemplary embodiments an optional uninterrupted power supply (battery backup) 90 may be incorporated and various components are plugged into the supply 90 to allow for operation (at least temporarily) in the event of a loss of power.

In exemplary embodiments the apparatus 10 may have an internet connection component 95 (not shown, but which may be built into computer 60 or 80) for transmitting and receiving information to and from the internet, such as, but not limited to, a connection via direct wire, Wi-Fi, satellite, cable, cell phone, or the like.

In exemplary embodiments, a housing 100 is provided in which the apparatus 10 may be contained. The housing 100 may be of any durable material and may be, for example, a combination of plastics and lightweight metals. Housing 100 may be suitably weather-proof to allow for the outdoor use and storage on apparatus 10 and may provide at least some insulating properties to limit extreme temperatures shifts which may be otherwise experienced by apparatus 10 within housing 100.

Figure 21:
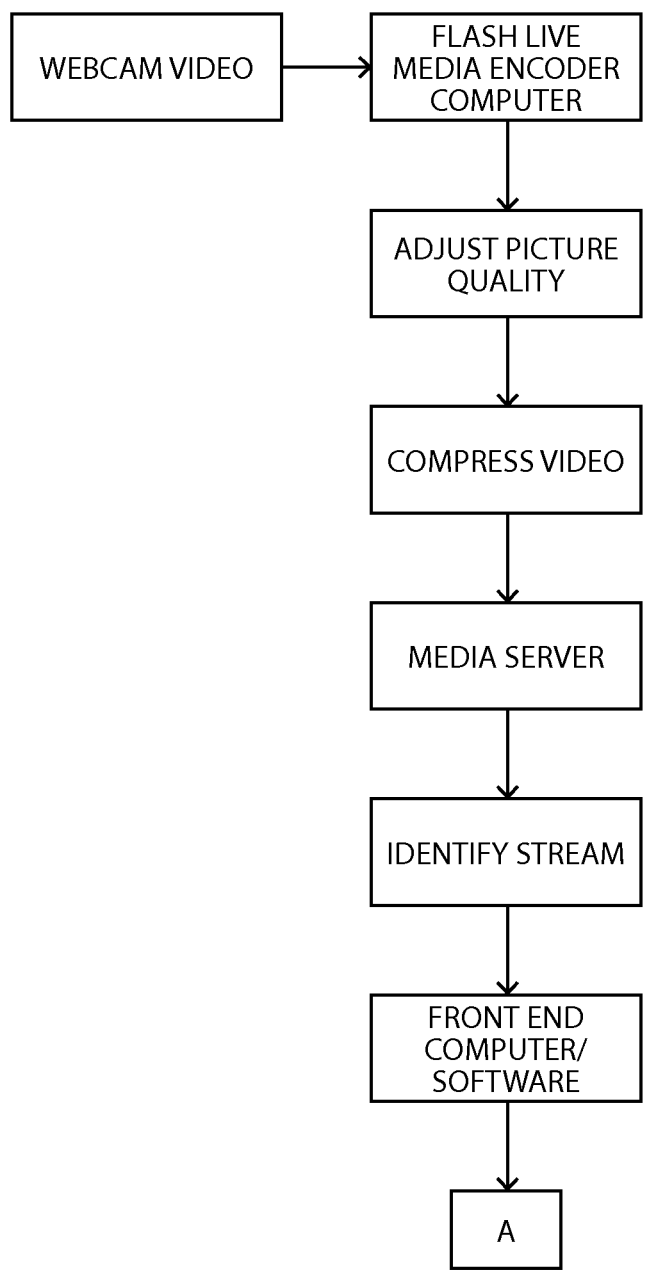
FIG. 21 is a flow diagram.
Figure 22:
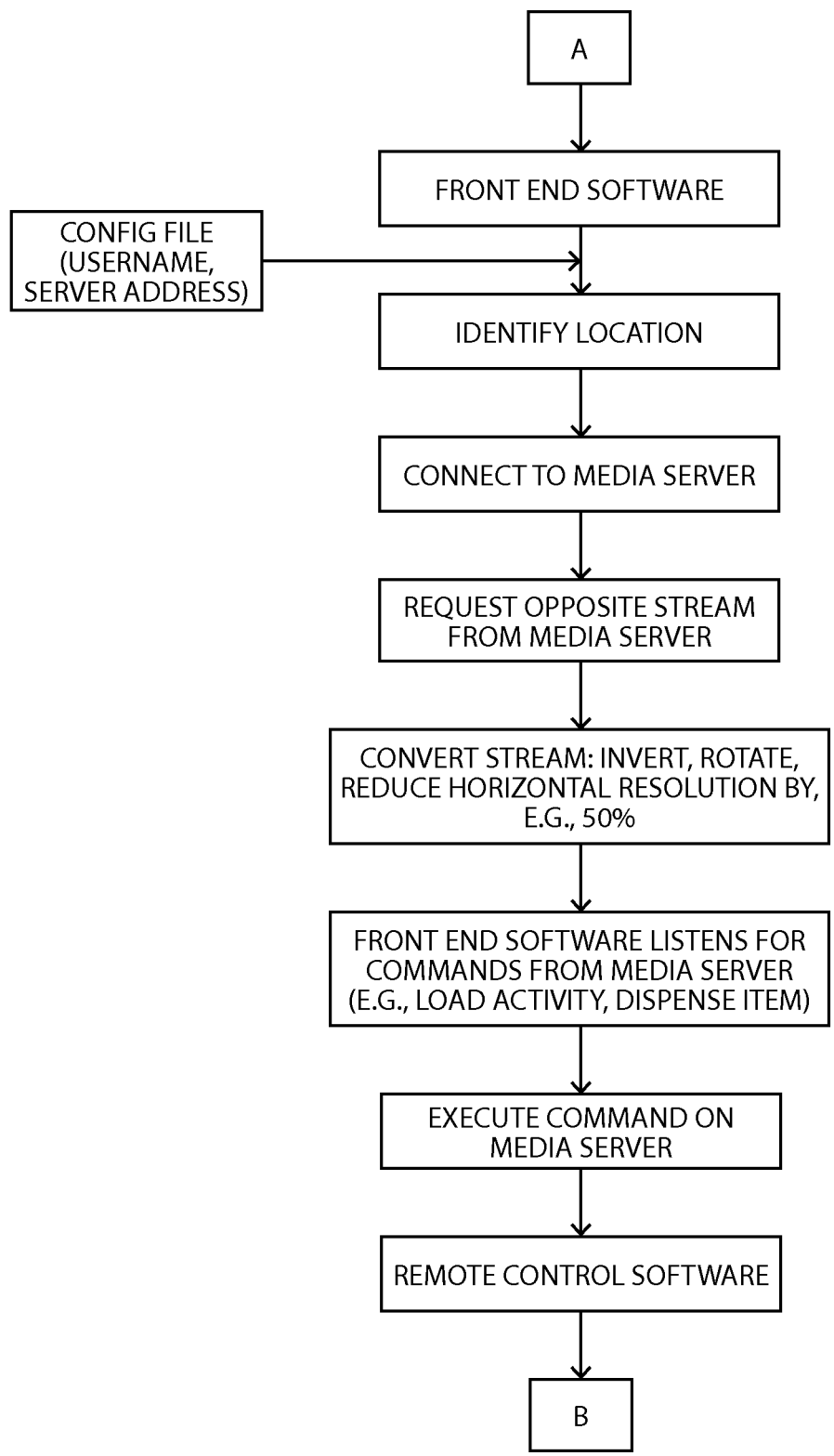
FIG. 22 is a flow diagram continuing from FIG. 21.
Figure 23:
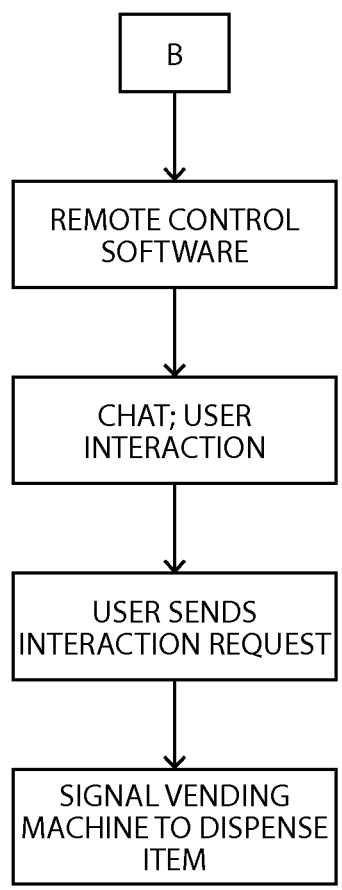
FIG. 23 is a flow diagram continuing from FIG. 22.
Figure 24:
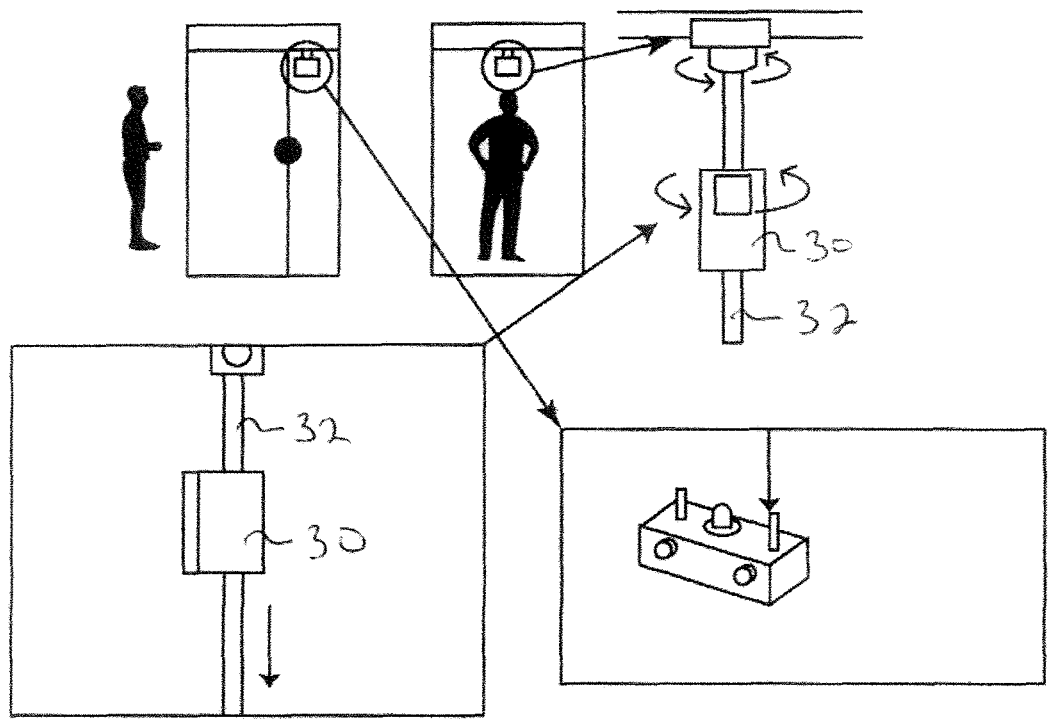
FIG. 24 is pictorial illustrations featuring various interactions between the user and camera.
Figure 24:
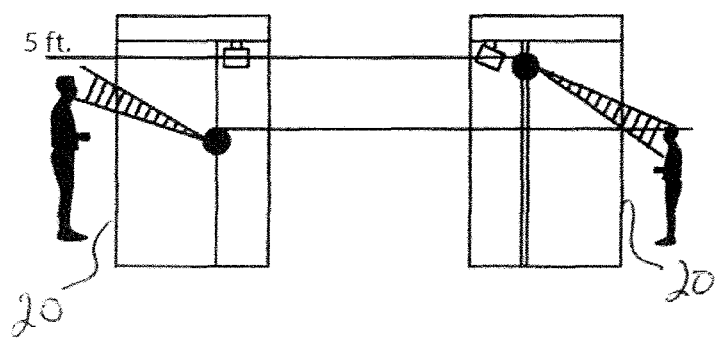

The following describes one exemplary embodiment of a method using the apparatus 10 as shown in the flow diagrams in FIGS. 21-23.

A first apparatus 10 unit (referred to as unit 10A) may be set up in a first geographic location. A second apparatus 10 unit (referred to as unit 10B) may be set up in a second geographic location, which may be nearby or in different parts of the world. An internet connection may be used to place the units 10A and 10B in communication. The units 10A and 10B may interact to allow a user of each unit to interact with each other in a virtual manner. It is to be understood that many apparatus 10 units may be set up around the world in various locations, each unit in communication either directly with the other units, or with the server 70, for example.

The camera 30 may be in electronic communication with the encoder computer 60. When actuated, the camera 30 can record video of a user U-A standing in front of the touch screen panel 20 of one of the apparatus 10 units. The apparatus unit 10B may record the video of a user U-B standing at the unit 10B. The recorded video may be encoded by the encoding computer 60, such as, but not limited to, using Flash Media Live Encoder.

In exemplary embodiments, the picture quality of video from the camera 30 may be adjusted by the front end computer 80 software to make up for lighting conditions, shutter speed and other factors. In exemplary embodiments, the video may then be compressed, such as, but not limited to, by using vp6 compression software. The compressed signal may then transmitted (from an apparatus unit 10A) to the server 70.

The server 70 software may read a configuration file (which may contain, among other data, the server address and username) and identifies the compressed video stream as coming from an apparatus unit 10 in a given location. The software requests the video stream from the "opposite" location (i.e., the location with which the apparatus unit 10A is in communication) from the server 70.

The front end computer 80 can receive (for example, buy pulling) a video stream of the user U-B standing at apparatus unit 10B from the server 70. The front end computer 80 software can invert, rotate and reduce by (for example) half the resolution of the video stream. The video stream now takes up the top half of the screen 24, leaving the bottom half black. This prepares the screen 24 to be projected using the projector 50. In one exemplary embodiment a top-bottom projector 50 is used. In another exemplary embodiment a side-by-side projector 50 can be used so as to divide the screen into left/right areas. In one exemplary embodiment, a plurality of projectors may be used to project more than one image, such as at least two distinct images and/or a single hologram-type image. The front end computer 80 software may await for and may receive commands from the server 70, such as, but not limited to, commands to load an activity or to actuate the dispensing apparatus 40.

The projector 50 may rear-project the video from the user U-A onto screen 24, which may be seen by the user U-B standing proximate to unit 10B. Accordingly, the user U-A may see at apparatus unit 10A streaming video of a remote user U-B projected onto (and through) the screen 24, while the user U-B can see streaming video of user U-A at apparatus unit 10B. It is to be understood that in exemplary embodiments, audio can also be streamed by using a microphone 120 incorporated with the apparatus 10 which records a user's voice (or other sounds) and is processed and streamed with the video feed.

In exemplary embodiments, remote control software connects to the server 70 and allows the users U-A and U-B to talk with each other or with other people at other locations. In exemplary embodiments the users may use their respective touch screen panel 20 to enter text on a keypad to allow the users to "chat," similar to instant messaging (SMS). In exemplary embodiments an operator in control of remote control software can send interaction requests to a given apparatus unit 10 to actuate the dispensing apparatus 40 to dispense an object 46. As would be appreciated by those skilled in the art, the server 70 may allow for access to and from third party social network platforms and may allow, for example, real-time tweeting and/or posting of contact between users U-A, U-B, and/or third parties.

In one exemplary embodiment of a user experience in which various apparatus 10 units are deployed in different locations, a user U-A may approach apparatus unit 10A and may place his/her hand on the touch screen panel 20, such as by placing his/her hand on the outline of a hand that is on the touch screen panel 20, for example. Touching the screen, for example, may initiate the process. A user may also be requested to log in, for example. The touch screen panel 20 may display a list of apparatus 10 unit locations (referred to for convenience as alpha, beta, gamma, etc.). The list of locations can highlight or otherwise indicate whether there is a user present at any other location at the moment. If there is at least one location identified, the user U-A (at location alpha) selects a location (for example, location beta) by touching the location indicated on the touch screen panel 20. A connection may be made between the apparatus unit 10A at location alpha and the apparatus unit 10B at location beta. The user U-B at location beta may see and, optionally, hear, the user U-A at location alpha, and vice versa, by means of the projected video stream from the opposite unit. The users U-A and U-B can thus see each other's image projected onto the screen 24 and may communicate with each other.

In exemplary embodiments, each user U-A and U-B may place a hand on the outline of the hand on the touch screen panel 20. When both hands are touching their respective touch screen panel 20, the front end computer 80 in apparatus unit 10A signals the dispensing apparatus 40 to dispense an object, such as, but not limited to, a chilled can of a beverage, which is conveyed to the outlet area 49 where the user U-A can receive and enjoy the beverage. Similarly, the front end computer 80 in apparatus unit 10B signals the dispensing apparatus 40 to dispense a beverage can which the user U-B can receive and enjoy.

In one exemplary embodiment, a portion of code, such as, but not limited to, the following Actionscript 3, may be employed to handle the dispensing of objects:

```
private function onReceiveBeverage(e:NetConnectionClientEvent) {
    if(arduino.pinNumber == 10) {
        arduino.pinNumber = 11;
    } else {
        arduino.pinNumber = 10;
    }
    arduino.sendBeverage( );
    trace("received beverage command from server");
}
```

In an exemplary embodiment the dispensing apparatus 40 may hold cans with labels printed in the language commonly associated with, for example, locations alpha, beta, gamma, and the like, so that a user U-A can receive a can with a label printed in the local language of user U-B in location beta. In this way, two people in very different locations around the world can each enjoy a beverage "from" (i.e., printed with the label from his/her new friend's country) the land of the other, thus creating a shared interactive experience.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

What is claimed is:

1. An apparatus for simultaneously recording a first live video stream and projecting a second live video stream onto an interactive touch screen, the apparatus comprising:
    a touch screen panel;
    a polarized acrylic screen;
    at least one video camera having a lens;
    an active shutter lens having a liquid crystal layer sandwiched between a first and a second outer layer, the active shutter lens being proximate to the video camera lens;
    a projector adapted to project an image onto the polarized acrylic screen;
    a first computer;
    a second computer;
    and means for connecting to the internet.

2. The apparatus of claim 1, further comprising a server adapted to communicate with at least one of the first or second computer.

3. The apparatus of claim 1, further comprising an apparatus for dispensing objects.

4. The apparatus of claim 3, wherein the objects are selected from the group consisting of beverages, food items, money, personal goods, and combinations thereof.

* * * * *